United States Patent
Kidera

(10) Patent No.: US 7,218,321 B2
(45) Date of Patent: May 15, 2007

(54) HIDDEN LINE PROCESSING METHOD FOR ERASING HIDDEN LINES IN PROJECTING A THREE-DIMENSIONAL MODEL CONSISTING OF A PLURALITY OF POLYGONS ONTO A TWO-DIMENSIONAL PLANE

(75) Inventor: Masayuki Kidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 10/808,534

(22) Filed: Mar. 25, 2004

(65) Prior Publication Data

US 2004/0189634 A1 Sep. 30, 2004

(30) Foreign Application Priority Data

Mar. 31, 2003 (JP) ............................. 2003-093868
Jan. 30, 2004 (JP) ............................. 2004-022814

(51) Int. Cl.
G06T 15/40 (2006.01)

(52) U.S. Cl. ...................................... 345/421; 345/422

(58) Field of Classification Search ................ 345/420, 345/421, 422
See application file for complete search history.

(56) References Cited

U.S. PATENT DOCUMENTS

| 5,220,646 | A | * | 6/1993 | Fossum ....................... 345/422 |
| 5,574,835 | A | * | 11/1996 | Duluk et al. ................. 345/421 |
| 5,870,095 | A | * | 2/1999 | Albaugh et al. ............. 345/422 |
| 2003/0043148 | A1 | * | 3/2003 | Mei et al. .................... 345/421 |
| 2004/0119710 | A1 | * | 6/2004 | Piazza et al. ................ 345/422 |

FOREIGN PATENT DOCUMENTS

| JP | 5-067219 | 3/1993 |
| JP | 7-37120 | 2/1995 |
| JP | 9-305791 | 11/1997 |
| JP | 2000-268191 | 9/2000 |
| JP | 2003-187263 | 7/2003 |

* cited by examiner

*Primary Examiner*—Ulka Chauhan
*Assistant Examiner*—Roberta Prendergast
(74) *Attorney, Agent, or Firm*—Staas & Halsey LLP

(57) ABSTRACT

A hidden line processing method includes the steps of obtaining the maximum value $PZ_{max}$ of the Z-axis direction component of each vertex in a viewpoint coordinate system for each of the plurality of polygons; sorting the plurality of polygons in a descending order based on the obtained maximum values $PZ_{max}$; obtaining a value $LZ_{min}$ that is the smaller of the Z-axis direction components in the viewpoint coordinate system of two end points of an arbitrary line obtained from the plurality of polygons; and comparing the maximum value $PZ_{max}$ of the Z-axis direction component of the plurality of polygons with the value $LZ_{min}$ that is the smaller of the above obtained Z-axis direction components of the arbitrary line, in the sorted order, wherein at the time when $LZ_{min} \geq PZ_{max}$, determination of whether or not the lines are hidden lines is avoided for polygons subsequent to the plurality of polygons sorted.

42 Claims, 15 Drawing Sheets

10 DISPLAY RANGE
AVOIDED PROCESSING FOR ERASING
11 LINE OF SIGHT
PG1  PG2  L  PG3  PG4 ...
Pzmax VALUE OF EACH POLYGON
Lzmin VALUE OF LINIE L 10 DISPLAY RANGE
PG POLYGON
11 LINE OF SIGHT
L LINE
16 INCLUSIVE CIRCLE
PROJECTED FIGURE OF THE LINE L L : RIDGE LINE.CONTOUR LINE
$P_i$ : A POLYGON HAVING A RIDGE LINE/CONTOUR LINE AS A SIDE
$N_i$ : THE NORMAL VECTOR OF Pi
$V_i$ : A SUMMIT OF Pi NOT BEING ANY END POINT OF ANY RIDGE LINE/CONTOUR LINE
$E_{ij}$ : A SIDE OF Pi NOT BEING ANY RIDGE LINE/CONTOUR LINE

HIDDEN LINE PROCESSING METHOD FOR ERASING HIDDEN LINES IN PROJECTING A THREE-DIMENSIONAL MODEL CONSISTING OF A PLURALITY OF POLYGONS ONTO A TWO-DIMENSIONAL PLANE

BACKGROUND OF THE INVENTION

1. Field of the Invention

The present invention relates generally to a hidden line processing method in converting three-dimensional image data into two-dimensional data. More particularly, the present invention relates to a processing method and an information processing apparatus for processing hidden lines, capable of processing at a high speed, in converting three-dimensional image data consisting of polygons into two-dimensional data, as well as to a program for controlling the processing method.

2. Description of the Related Art

In these years, three-dimensional CADs and mechanism simulators have become widely used, in development of industrial products. Along with this, the cases have been more frequently seen where shape recognition of products are handled as models having virtual three-dimensional space coordinate data.

On the other hand, at production sites, it is the current state that displayed screens on displays or instruction manuals for assembling are often used when models are observed and grabbed. Therefore, it is desired that a line image is displayed or created as an image in an instruction manual for assembling is created through projecting a model represented by three-dimensional coordinate data onto the two-dimensional plane of the display from a direction.

Here, in the case where a model projected onto a two-dimensional plane or a model created for an instruction manual for assembling is assembled from a plurality of parts and each of the parts consists of a plurality of polygons, the above model has data for polygons and lines constituting the parts that do not appear on the surface of its visible area.

Therefore, in the case where the three-dimensional data of the polygons contained in the model are simply converted into two-dimensional data and are displayed on a display screen or are converted into an image for an instruction manual for assembling, the lines and faces hidden by the surface of the model are also displayed. In this case, the mode image displayed or the model image drawn on the instruction manual for assembling is hard to understand.

Thus, the function of processing the hidden lines and hidden faces for not displaying the lines and faces not necessary for displaying is an essential technique for making the shapes in the image more recognizable. As such a technique for processing hidden lines and hidden faces, Z-buffer method and scan-line method are known. The Z-buffer method is a method for displaying with priority the polygons having coordinates close to the viewpoint side by having a buffer memory corresponding to a three-dimensional space and sorting the three-dimensional coordinates that a plurality of polygons constituting the model have. Therefore, the polygons having the coordinates farther that those of the polygons displayed with priority are not displayed. That is, the hidden lines are processed such that they are erased.

In addition, the scan-line method is a method for hidden-face-erasing processing by slicing the model in the vertical direction and scanning from the viewpoint the sectional views.

However, in these conventional techniques, the following drawbacks are present. In the Z-buffer method described first, though it is possible to create an image in a short time by executing the hidden-line/hidden-face processing to the raster data using the known techniques such as the Z buffer it is impossible to execute operations such as enlarging/reducing/color-changing of specific lines when creating drawings and instruction manuals for assembling. Because of such points, the method has problems in operability and display quality in the process for converting into the two-dimensional data.

In the case of the scan-line method described secondly, it is a preferable method because the above problems in the Z-buffer method are avoided and the operability is excellent when vector data are used for creating drawings and instruction manuals for assembling. However, the method has problems that it is necessary to execute hidden-line/hidden-face processing analytically and a large amount of memory consumption and processing time are necessary and, therefore, it is difficult to apply the method to a large-scale three-dimensional coordinate model.

Considering such points, a method for facilitating speedup of processing by reducing the number of polygons to be processed by selecting only the faces facing the front side against the viewpoint as the faces to be hidden-line processed has been proposed previously by the inventor (see Japanese Patent Application Laid-Open Pub. No. 1993-67219).

In addition, as other techniques relating to hidden-face processing, an invention which has a circuit for, taking the image processing of a rotating object as a target, obtaining the inner product of the normal vector of a polygon face and a rotation-processed line-of-sight vector and determining whether the polygon is visible or invisible from the value of the obtained inner product (see Japanese Patent Application Laid-Open Pub. No. 1995-37120) and an invention for, providing a Z-buffer, executing hidden-face processing using the Z-buffer method when overlapping of representative values of coordinates in all the three directions of X, Y and Z is detected and executing hidden-face processing by overwriting when any overlapping is detected (see Japanese Patent Application Laid-Open Pub. No. 2000-268191) have been presented.

Furthermore, as techniques proposed previously by the inventor, an invention in which, when three-dimensional shape information of a solid is converted into two-dimensional shape information, only the hidden lines present on the side in a specific direction against an arbitrary boundary plane crossing the solid are outputted is listed (see Japanese Patent Application Laid-Open Pub. No. 2003-1817263).

SUMMARY OF THE INVENTION

The object of the present invention is, as an example, to provide a method for facilitating speedup of the hidden-line processing in which the polygons present on the front side are selected using the invention described in Japanese Patent Application Laid-Open Pub. No. 1993-67219 and, in addition, prohibiting displaying of lines hidden under the polygons present on the front side. A further object of the present invention is to provide a hidden-line processing method for facilitating speedup of processing by reducing the number of lines to be processed in the hidden-line processing for above-described prohibiting of displaying lines, as well as to provide an information processing apparatus to be applied with the method and a program for executing the hidden-line processing method.

In order to achieve the above objects, according to a first aspect of the present invention there are provided a hidden line processing method and an information processing apparatus for executing a process for avoiding projection of lines hidden by a plurality of polygons in projecting a three dimensional model consisting of the polygons onto a two-dimensional plane, the method comprising the steps of obtaining the maximum value $PZ_{max}$ of the Z-axis direction component of each vertex in a viewpoint coordinate system for each of the plurality of polygons belonging to parts constituting the three-dimensional model; sorting the plurality of polygons in a descending order based on the obtained maximum values $PZ_{max}$; obtaining a value $LZ_{min}$ that is the smaller of the Z-axis direction components in the viewpoint coordinate system of two (2) end points of an arbitrary line obtained from the plurality of polygons; and comparing the maximum value $PZ_{max}$ of the Z-axis direction component of the plurality of polygons with the value $LZ_{min}$ that is the smaller of the above obtained Z-axis direction components of the arbitrary line, in the sorted order, wherein at the time when $LZ_{min} \geq PZ_{max}$, determination of whether or not the lines are hidden lines is avoided for polygons subsequent to the plurality of polygons sorted.

Preferably, for the plurality of polygons belonging to the arbitrary part, each of their normal vectors has a component in the opposite direction against the direction of the line of sight from the viewpoint of the viewpoint coordinate system.

In order to achieve the above objects, according to a second aspect of the present invention there are provided a hidden line processing method and an information processing apparatus for executing a process for avoiding projection of lines hidden by a plurality of polygons in projecting a three-dimensional model consisting of the polygons onto a two-dimensional plane, the method comprising the steps of for a priority polygon group including a predetermined number of polygons obtained in the order of large projection area made when each of a plurality of polygons constituting a three-dimensional model is projected onto a two-dimensional plane, and for a plurality of polygon groups constituting a part to which a line undergoing determination to be a hidden line or not; and in the order of the priority polygon group and the plurality of polygon groups constituting the part, obtaining the maximum value $PZ_{max}$ of the Z-axis direction component of each vertex in a viewpoint coordinate system for each of the plurality of polygons sorting the plurality of polygons in a descending order based on the obtained maximum values $PZ_{max}$; obtaining a value $LZ_{min}$ that is the smaller of the Z-axis direction components in the viewpoint coordinate system, of two (2) end points of an arbitrary line obtained from the plurality of polygons and comparing the maximum value $PZ_{max}$ of the Z-axis direction component of the plurality of polygons with the value $LZ_{min}$ that is the smaller of the above obtained Z-axis direction components of the arbitrary line, in the sorted order, wherein at the time when $LZ_{min} \geq PZ_{max}$, determination of whether or not the lines are hidden lines is avoided for polygons subsequent to the plurality of polygons sorted.

Preferably, the arbitrary line is a side common to polygons adjacent to each other, of which the angle formed by respective normal vectors is not equal or close to 0°. The method may further comprise the steps of defining an inclusive circle including vertices of the polygon when each of the plurality of polygons is projected onto a two-dimensional plane determining whether a portion of an arbitrary line is present in the inclusive circle corresponding to the polygon for the polygons for which determination of whether or not the line is an internal line is not avoided; and erasing hidden line portions on the two-dimensional plane when the portion of the arbitrary line is present in the inclusive circle.

In order to achieve the above objects, according to a third aspect of the present invention there are provided a method and an information processing apparatus for identifying as an internal line a ridge line or an contour line of a three-dimensional model, appearing when only the interior of the three-dimensional model is displayed in projecting the three-dimensional model consisting of a plurality of polygons onto a two-dimensional plane, the method comprising the steps of determining the value in the Z-axis direction of a normal vector belonging to each of two polygons having a ridge line or an contour line of the three-dimensional model as a common side and determining the common side as an internal line if the value in the Z-axis direction of any of the normal vectors of the two polygons is determined zero (0) or less based on the determination of the direction of the normal vector The method may further comprise the step of determining the common side as an internal line when the senses of the values in the Z-axis. direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

According to the present invention, it is possible to facilitate speedup in hidden-line processing for prohibiting displaying of lines hidden under polygons, and to reduce considerably the time necessary for the entire processing.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Figure 1:
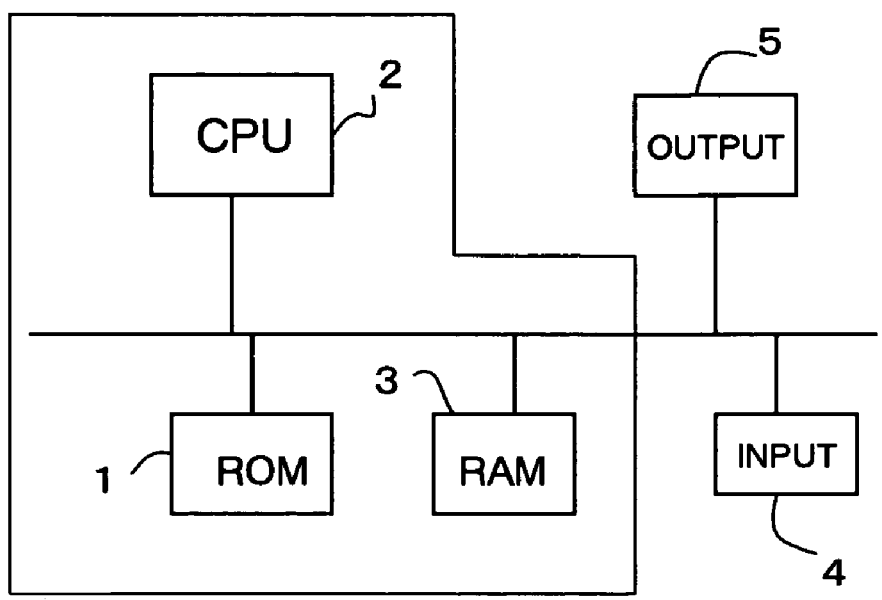
FIG. 1 is a block diagram of an example of the composition of a CAD apparatus implementing a hidden-line processing method in conversion of three-dimensional image data into two-dimensional data of the present invention.

Embodiments of the present invention will now be described with reference to the drawings. It is to be noted however that the embodiments shown in the drawings are for understanding the present invention and that the technical scope of the present invention is not limited thereto.

FIG. 1 is a block diagram of an example of the composition of an information processing apparatus used as a CAD apparatus implementing a hidden-line processing method in the conversion of three-dimensional image data into two-dimensional data of the present invention. A program for controlling the method of the present invention and program data are stored in a ROM 1. A CPU 2 as means for executing and controlling the program reads out this program from the ROM 1, executes and controls the program. A RAM 3 is a main memory for storing temporarily data in a calculation process step in the course of the hidden-line processing method.

Inputting means 4 is operated by an operator and executes inputting of required data when necessary in the during the execution of the hidden line processing method. Outputting means 5 includes a display apparatus, a printer, a data file etc. and displays a three-dimensional coordinate model before the conversion, displays it on the display apparatus as an output after the conversion, or outputs it on a paper sheet using the printer.

Figure 2:
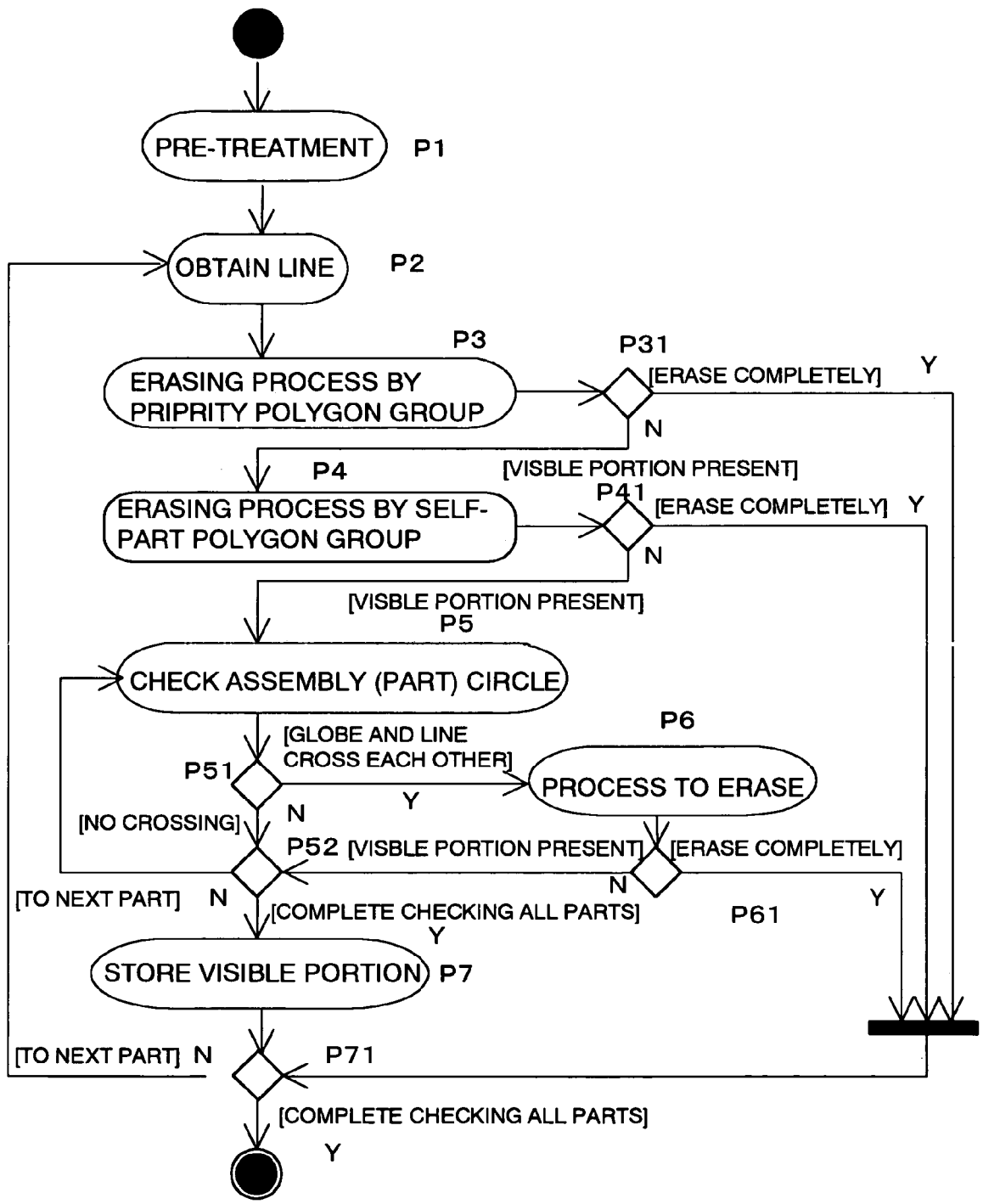
FIG. 2 is a flow of process steps of the hidden-line processing method of the present invention.
Figure 3:
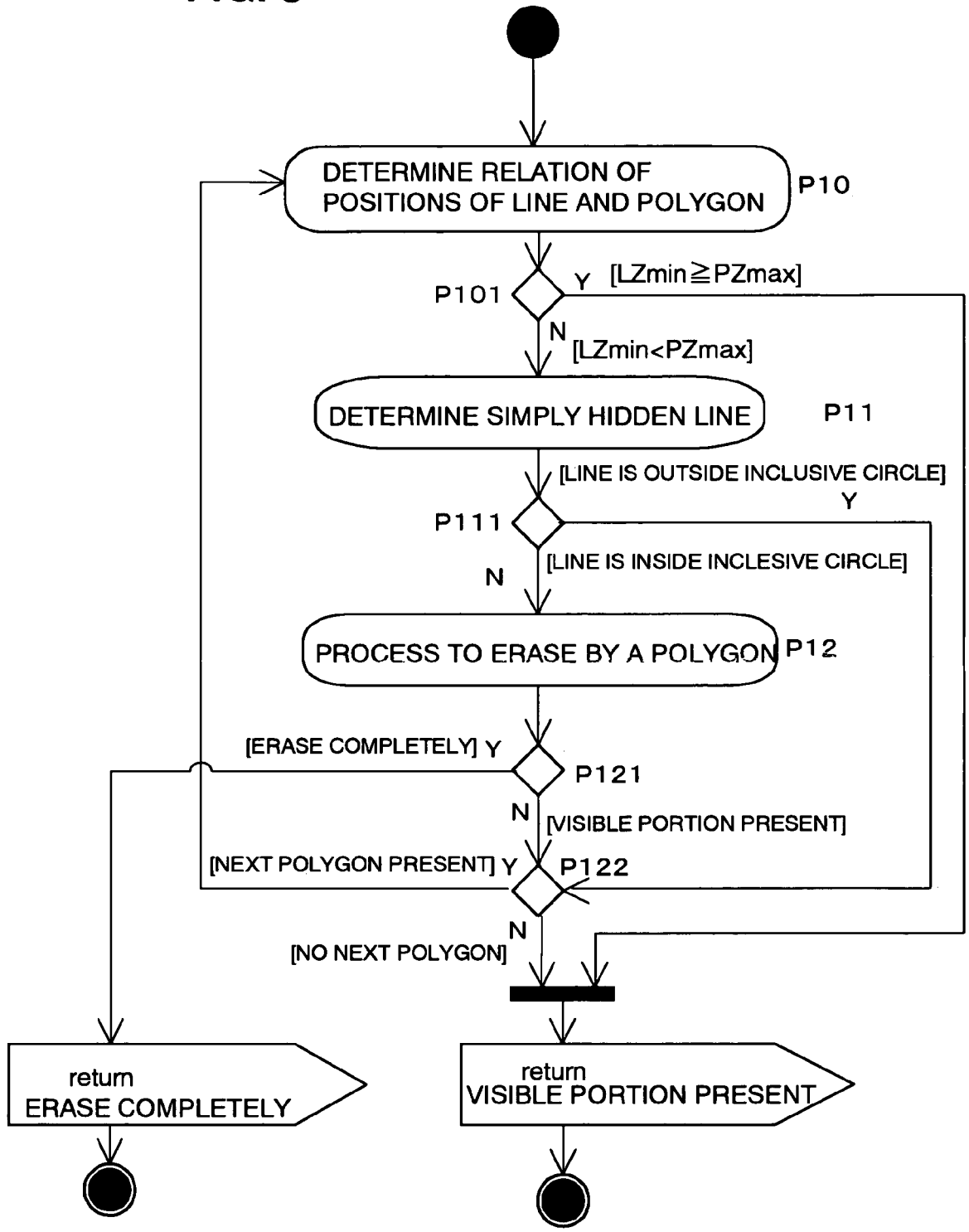
FIG. 3 is a process flow for erasing an entire line by a polygon group shown in FIG. 2.

FIGS. 2 and 3 show a flowchart illustrating the steps of the process of the hidden line processing method according to the present invention. A program for executing such steps of the process is stored in the ROM 1 in the system diagram shown in FIG. 1.

[Pre-Treatment]

As a precondition for the process, a pre-treatment (Process Step P1) is executed. The contents of this pre treatment are as follows.

First, the elements constituting the three-dimensional model are broken up in a tree-like system as shown in FIG. 4 based on the program data. FIG. 4 show a three-dimensional model illustrating a CD-ROM drive apparatus as an example of an embodiment.

Figure 4A:
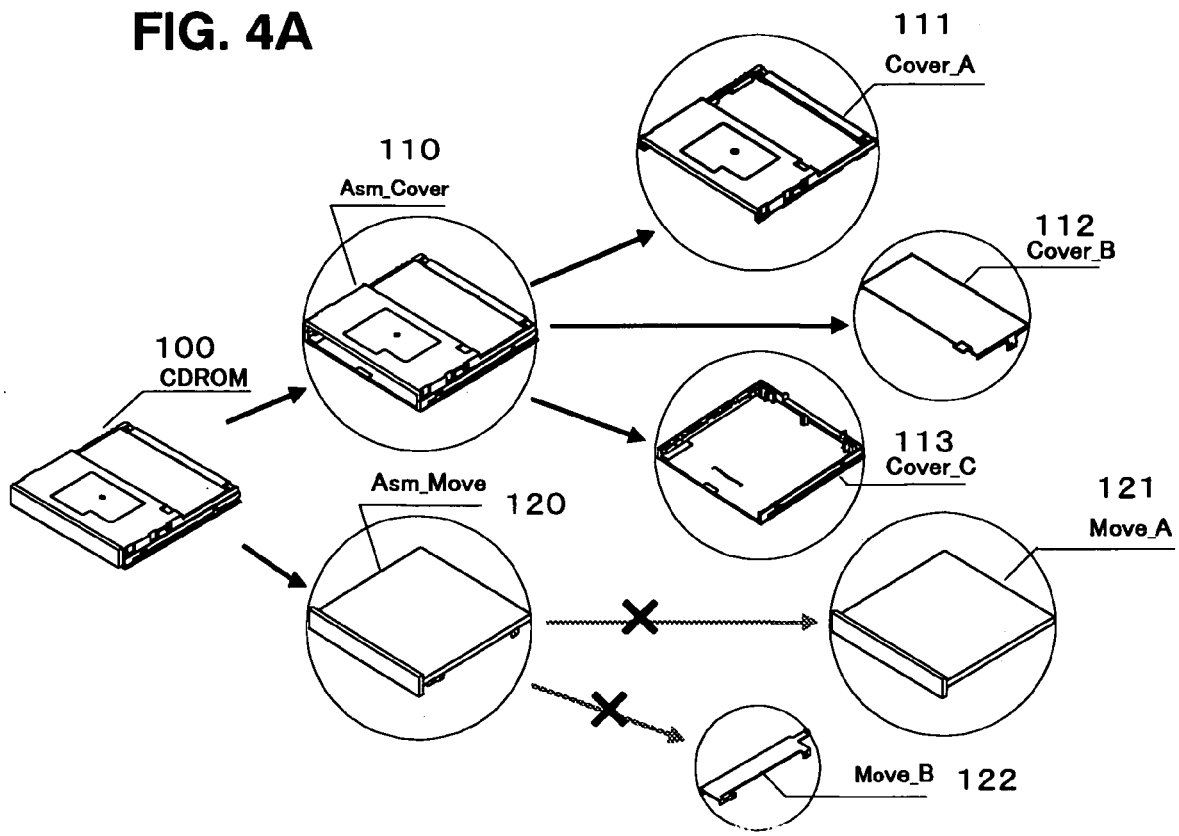
FIG. 4 is a diagram showing each element constituting a three-dimensional model breaking down in a tree-like system.
Figure 4B:
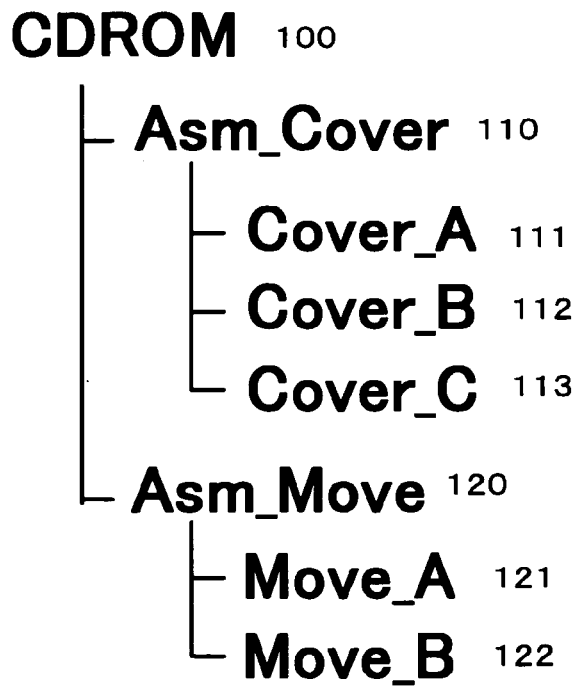

In FIG. 4, FIG. 4A. is a diagram showing each of assemblies constituting a CD-ROM drive apparatus 100 as a completed piece diverging them and arranging them in tiers for each node in a tree-like system. FIG. 4B is a diagram showing the tier structure of assembly data corresponded to the tree shown in FIG. 4A.

The CD ROM drive apparatus (CD ROM) 100 as a three-dimensional model is diverged to a cover assembly (Asm_Cover) 110 and a moving assembly (Asm_Move) 120. The cover assembly (Asm_Cover) 110 further consists of cover elements A(Cover_A) 111, B (Cover_B) 112 and C (Cover_C) 113.

Furthermore, the moving assembly (Asm_Move) 120 consists of moving elements A (Move_A) 121 and B (Move_B) 122.

Here, the cover elements A (Cover_A) 111, B (Cover_B) 112 and C (Cover_C) 113, and the moving elements A (Move_A) 121 and B (Move_B) 122 are minimum unit parts and it is impossible to break up any further.

Then, only each of such minimum unit parts has data of a plurality of polygons, constituting each of the parts, having vertex data containing three dimensional position coordinates at their vertices. Therefore, an upper order part containing minimum-unit parts contains the data of a plurality of polygons constituting these minimum unit parts.

The CD-ROM apparatus 100 has the three-dimensional coordinate data of the polygons constituting all the minimum-unit parts. Then, when such data of the polygons are converted into two-dimensional data and displayed, the unnecessary lines that should be hidden originally are also displayed.

The present invention expedites the process for erasing the above unnecessary lines and executes a hidden-line erasing process with the following pre-treatment as a precondition.

As a precondition, first, in the case where a CD-ROM apparatus 100 being a completed piece is projected onto a two-dimensional plane, when it is observed from the direction of the line of sight, only the polygons of which the surfaces are facing toward the line of sight are selected and the maximum values (PZ max value) of the Z-component of each vertex that the selected polygons have are obtained.

Here, as the method for selecting the only polygons of which the surfaces are facing toward the line of sight, the method described in the above-described, Japanese patent Application laid Open Pub. 1993-67219 can be applied.

Figure 5:
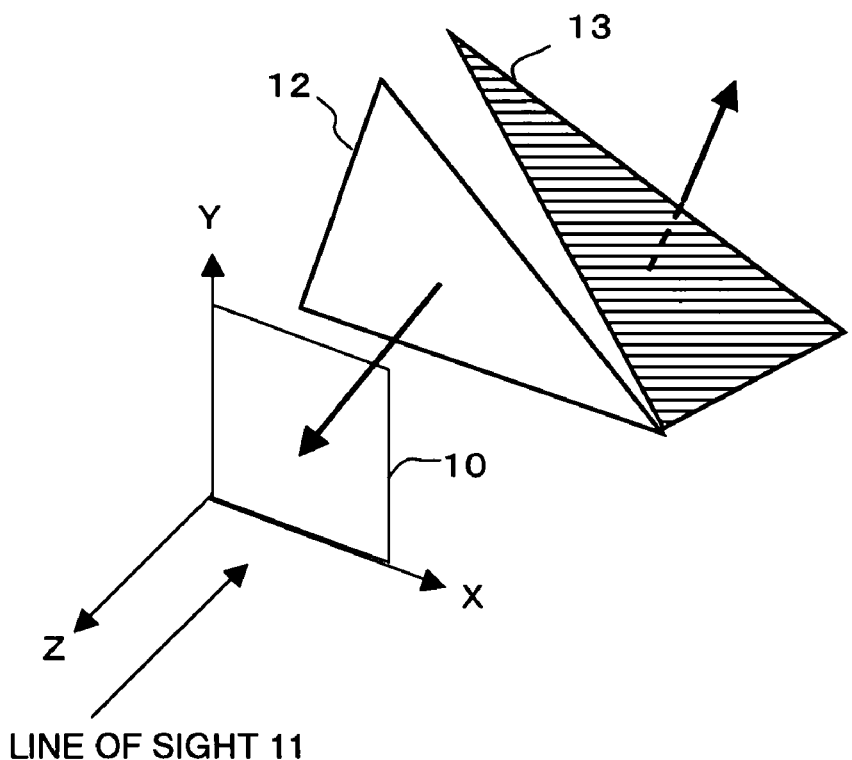
FIG. 5 illustrates a method for selecting only the polygons of which the surfaces are facing toward the line of sight when polygons are projected onto a two dimensional plane.

FIG. 5 illustrates a method for selecting only the polygons of which the surfaces are facing toward the line of sight 11 when polygons are projected onto a. two-dimensional plane 10 and polygons projected onto the two-dimensional plane 10 observably from the direction of the line of sight.

That is, only the polygons for which the sign of the component in the Z-axis direction of the normal vector of a plurality of polygons (in FIG. 5, polygons 12 and 13 are shown) is positive in FIG. 5 and of which the surfaces are facing toward the line of sight 11 (a polygon 12 is corresponded to) are selected. Since the component in the Z-axis direction of a normal of the polygon 13 is in an opposite direction against the Z axis, its back face is projected when the polygon 13 is projected onto the two-dimensional plane 10. Therefore, it is excluded from the polygons to be selected.

Figure 6:
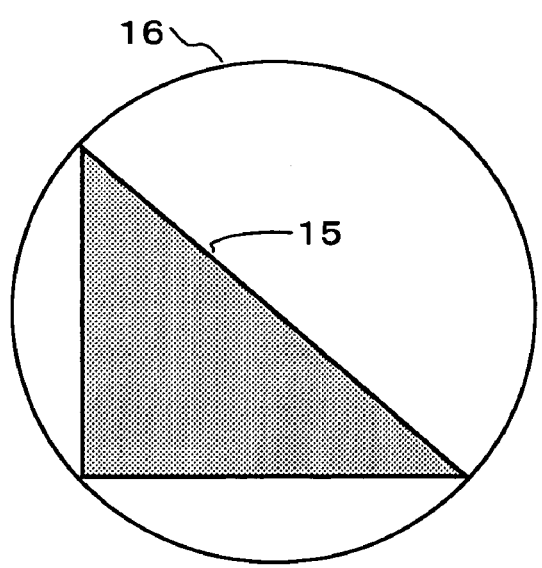
FIG. 6 illustrates the projected area and the inclusive circle.

Next, the projected area and the inclusive circle made when the polygon 12 selected as above is projected onto the two-dimensional plane 10 are obtained. FIG. 6 illustrates the projected area and the inclusive circle. In FIG. 6, a projected area 15 is the area of the polygon projected onto the two-dimensional plane and an inclusive circle 16 means a circle which includes the vertices of the projected polygon.

Next, as shown in FIG. 6, each respective projected area 15 of the selected polygons are obtained, and a predetermined number (for example, ten (10)) of those polygons in the order from the one having the largest area are obtained as specific polygons and are defined as priority polygons.

Then, for each part (in FIGS. 4A and 4B, the minimum-unit parts 111–113, 121 and 122), polygons are sorted in order referring to the maximum values, PZmax values of the Z-axis coordinate values of the vertices held by each of the plurality of polygons constituting the corresponding part.

Figure 7:
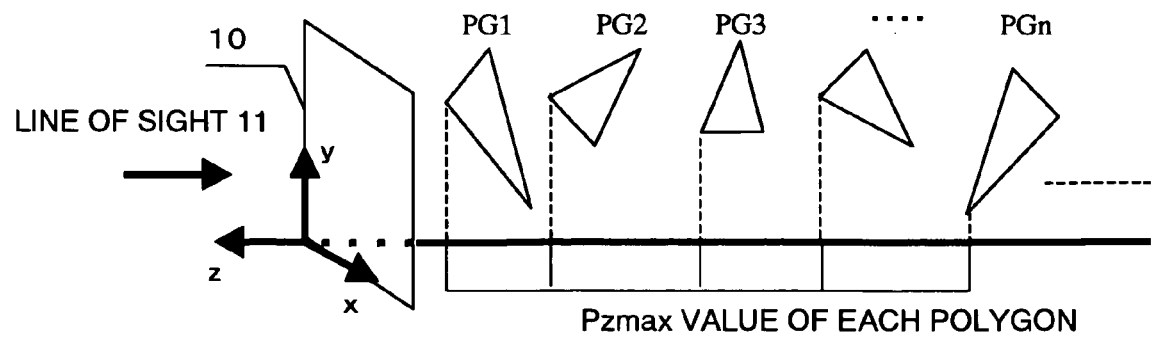
FIG. 7 illustrates the state of the sorting in the Z-axis direction of a polygon.

FIG. 7. illustrates the state of the sorting. The plurality of polygons, n polygons PG1, PG2, . . . PGn are arranged in the order of the maximum values, PZmax values of each Z-axis coordinate value of the polygons. In FIG. 7, the Z-axis coordinate value increases as it proceeds to the left.

[Obtaining Lines]

Lines are obtained following the above pre-treatment (Process Step P2). The method of such obtaining of lines will be described as follows.

When polygons adjacent to each other having a common side are on a plane, said common side is defined not as a line on the polygons because the faces of polygons adjacent to each other having an angle equal or close to 0° formed by the normal vectors of each of the polygons at the center of gravity of each of the polygons are regarded as an approximately continuous plane.

On the contrary, when the angle formed by the normal vectors of each of the polygons adjacent to each other at the center of gravity of each of the polygons is not equal or close to 0°, the common side of the polygons is obtained as a line because the polygons adjacent to each other continues from each other forming an angle between, them over the common side as the border.

Figure 8A:
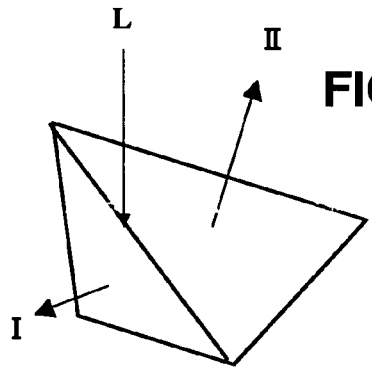
FIG. 8 illustrates a method for selecting a line (Part 1)
Figure 9A:
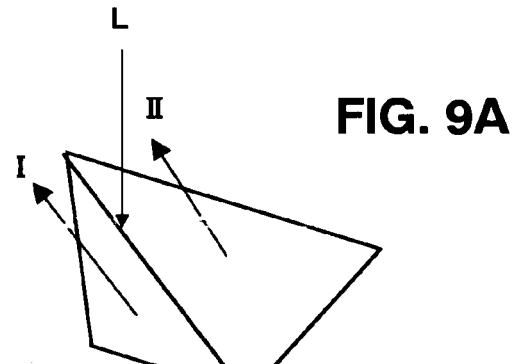
FIG. 9 illustrates a method for selecting a line (Part 2)

FIGS. 8 and 9 illustrate this continuation. In FIGS. 8A and 9A, two (2) polygons adjacent to each other having a common side L are shown. Then, the normal vectors at the center of gravity of each of the polygons are I and II.

Figure 8B:
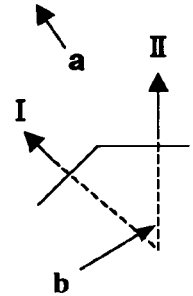
Figure 9B:
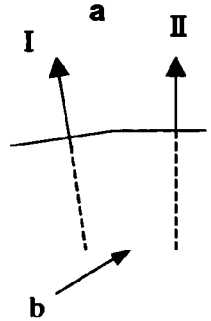

FIGS. 8B and 9B show an angle "b" formed by the normal vectors I and II of the two polygons when observed in the horizontal direction along a direction "a" of the side L. The angle b in FIG. 8B is larger than 0° and the side L forms a border ridge between the two (2) polygons adjacent to each other. Therefore, in this case, the common side L is obtained as a line.

On the other hand, in the case shown in FIG. 9B, the normal vectors I and II of the two (2) polygons are approximately in parallel and, therefore, the angle b formed by the normal vectors I and II of the two (2) polygons is or close to 0°. In this case, the two polygons adjacent to each other make a continuous plane and the common side L is not obtained as a line.

[Line-Erasing Process by a Polygon Group]

A line erasing process by a polygon group is executed to the line obtained as above. That is, for the line hidden by polygons projected and displayed onto the two-dimensional plane 10, erasing is executed such that this line is not displayed, in the projection onto the two-dimensional plane. Thereby, displayed model projected onto the two-dimensional plane is made clear to see.

Here, a polygon group is a set of one (1) or more polygons and refers to the priority polygon group, the self-part polygon group and the plurality of other's-part polygon group obtained in the above pre-treatment.

The priority polygon group means the plurality of priority polygons described in the above [Pre-Treatment]. The self part polygon group means the plurality of polygons constituting the parts (the parts 111–113, 121 and 122 in FIG. 4) to which the obtained line belongs. Furthermore, the other's-part. polygon group means other polygons obtained in the [Pre-Treatment].

Then, the erasing process of a line by a polygon group is an erasing process by the priority polygon group (Process Step P3) as shown in FIG. 2. Then, an erasing process by the self-part polygon group (Process Step P4) is executed followed by an erasing process by the other's part polygon group (Process Step P6). This order of erasing processes corresponds to the order of high possibility of erasing an arbitrary line.

Especially, the erasing process by the priority polygon group uses one or more polygons selected in the order of large area of the shape of a polygon projected onto a two-dimensional plane (screen) (projected area) among the polygons to be hidden-line processed. This is because the possibility of erasing a line is higher for the case where an erasing process is executed with a polygon having a large projected area than the case with a polygon having a small projected area.

When the whole portion of one (1) obtained line is completely erased, it is not necessary to execute any erasing process using another polygon and the speedup of the process to proceed to the next line-erasing process is facilitated.

As an embodiment, as described above, among the polygons constituting a three (3)-dimension model, ten (10) polygons having the largest projected areas among the polygons which are present within the output range of the final drawing and of which the surfaces are facing toward the viewpoint are obtained.

However, application of the present invention is not limited to the order of the polygon groups for the above erasing of lines.

Then, the procedures of the hidden line erasing by the above polygon groups (Process Steps P3, P4 and P6) are common and each of them are processed according to the flow shown in FIG. 3. The process of FIG. 3 will be described taking an example of the erasing process by the priority polygon group as a representative case.

[Erasing Process by the Priority Polygon Group]

First, the erasing process by the priority polygon group (Process Step P3) is executed. The process is proceeded according to the flow shown in FIG. 3 as follows.

In FIG. 3, the relation of the line and the polygon is determined (Process Step P10). As described above, at the stage of the [Pre-Treatment], the polygons have been sorted in a descending order based on their Z values in the viewpoint coordinate system for the units of each polygon group.

Therefore, an erasing process for a polygon belonging to a polygon group is avoided when $LZ_{min} \geqq PZ_{max}$, ($LZ_{min}$ means the Z value of an end of a line having a smaller Z value than that of another end (the end farther from the position of the viewpoint than another end). $Z_{max}$ means the largest Z value of the vertex among the vertices of the polygon (the vertex closest to the position of the viewpoint).).

Figure 10:
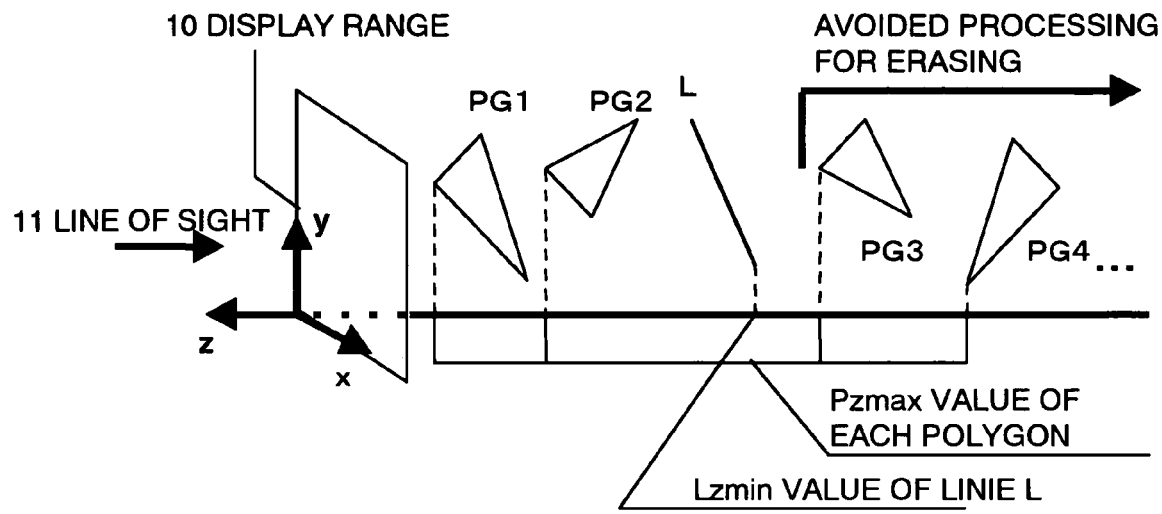
FIG. 10 illustrates a determination process (Process Step P10) of the relation of positions between the line L and the polygon shown in FIG. 2.

FIG. 10 illustrates a determination process of the relation of positions between the line L and the polygon (Process Step P10).

In FIG. 10, the polygons PG3, PG4, . . . , PGn each having a $PZ_{max}$ value smaller than the $LZ_{min}$ value of a line L are excluded from the polygons to be processed for erasing lines (Process Step P101, Y).

[Simplified Determination of Hidden-Line Processing]

Next, a simplified determination of hidden-line processing (Process Step P11) is executed to the polygons survived the avoidance of the above erasing process and having the relation of $LZ_{min} \geqq PZ_{max}$ (Process Step P101, N).

The inclusive circle 16 (see FIG. 6) has been defined, in the [Pre-Treatment] stage described above, for the projected figure of each polygon necessary for the hidden-line processing.

Figure 11:
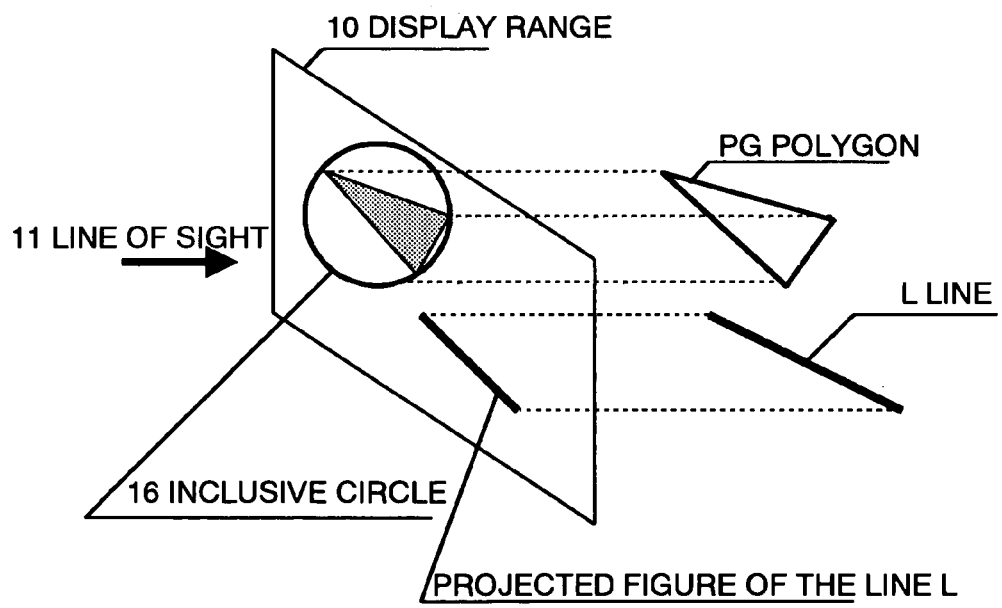
FIG. 11 illustrates an example of the case where a line L is present outside an inclusive circle 16 including the polygon.

When considered on a screen (two-dimensional plane), if the line L is present outside a polygon inscribed in the inclusive circle 16 as shown in FIG. 11, this polygon does not erase the line L and, therefore, the process is avoided (Process Step P111, Y). In other cases, that is, when a portion of the line is present inside the inclusive circle 16 (Process Step P111, N), the line is process to be erased (Process Step P12).

In the hidden-line processing for the corresponding polygons (Process Step P12), when the projection, is made onto a two-dimensional plane, the line is hidden by the polygon and erased not to be displayed. Then, when the line L is completely erased by the Process Step P12 (Process Step P121, Y), returning to FIG. 2, the process is proceeded to the process for the next line (FIG. 2: Process Step P71, N).

On the other hand, when a portion of the line is not erased, as far as the polygon to be the target is present, the process is proceeded to a hidden-line processing by the next polygon (Process Step P122). When the polygon being the target is not present, the process is proceeded to the next step in FIG. 2.

[Erasing Process by the Self-Part Polygon Group]

In FIG. 2, in the case where the erasing process by the priority polygon group (Process Step P3) has been completed and a visible portion of a line still remains (Process Step P31, N), the erasing process by the self-part polygon group is executed (Process Step P4).

As described above, the self-part polygon group means the polygons belonging to the same part as the part to which the obtained line belongs. For example, in FIG. 4, they are the plurality of polygons constituting the cover part 111 (cover_A) for the line shown in the cover part 111 (cover_A) and they also are the polygons selected in the [Pre-Treatment]. A process to erase one (1) line is executed according to the process flow described referring to FIG. 3 for these self-part polygon groups.

[Avoidance of Process by Part-Inclusive Circle/Assembly-Inclusive Circle]

Furthermore, in the case where a visible portion also remains (Process Step P41, N) after the line-erasing process for the self-part polygon group (Process Step P4), an assembly (part) circle check is executed (Process Step P5).

A three-dimensional model for a three-dimensional CAD or a simulator usually has a tree like composition consisting of the assembly parts 110 and 120 being the sets formed by parts 111–113, 121 and 122 each having the minimum unit part form and a plurality of parts as shown in FIG. 4.

Therefore, even in the case where the line erasing process for the self-part polygon group (Process Step P4) has been executed, lines in other parts are likely to be displayed when the CD ROM apparatus 100 being a completed body is displayed on the two-dimensional plane. In order to avoid this, the assembly (part) circle check process (Process Step P5) is executed.

In the assembly (part) circle check process (Process Step P5), at each node of the tree shown in FIG. 4, whether a portion of a line is present inside the part circle (a circle inscribed by the minimum unit parts 111–113, 121 and 122) and the assembly circle (a circle inscribed by the upper order parts 110 and 120 including the minimum unit parts) is determined (Process Step P51).

Then, If not present, hidden-line processing of all the parts at the node and at all the nodes under the node is avoided (Process Step P51, N). For example, if a portion of a line of an assembly inclusive circle of the assembly part (Asm_Cover) 110 is included on the screen, check of position relation with node circles surrounding the parts (Cover_A, Cover_B and Cover_C) 111–113 under the child node is executed for the line.

In the case where a portion of the part circle is included, an erasing process by the polygon group according to the flow shown in FIG. 3 is executed (Process Step P6).

In the case where, in the assembly part (Asm_Move) 120, a portion of a line is not included by an inclusive circle surrounding the assembly part, erasing processes at the node itself and its child nodes or under them are avoided (in FIG. 4, "X" indicates the avoidance of the erasing processes.).

However, though some three-dimensional CAD or simulators have part globes or assembly globes including parts and their assemblies in a three-dimensional space, these globes include parts even when projected from any position. Therefore, they can be regarded as part circles and it is possible to apply a response S in the process described above.

[Display of Visible Portion]

The portion not having been erased after undergoing the step of the above assembly (part) circle check (Process Step P5) becomes a visible portion when the CD-ROM apparatus 100 being a completed body is projected onto the two-dimensional plane. Therefore, this line is stored in a storage unit (Process Step P7) and all the processes have been finished (Process Step P71).

[High-Speed Conversion of Three-dimensional Model into Line Image Information]

Here, in the above description for the processes, the [Obtaining Line] is executed (Process Step P2) following the [Pre-Treatment] (Process Step P1) and the [Line-Erasing Processes by Polygon Groups] (Process Steps P3, P4 and P6) are executed for the obtained lines.

As the first consideration, the process time of this [Line-Erasing Processes by Polygon Groups] is in proportion to the product of the number of lines created from a three-dimensional model to be processed and the number of polygons necessary for the hidden-line processing.

Therefore, the cost for calculation for the case where line images, are created from a large-scale three-dimensional model is very high. Thus, a technique that reduces the number of the lines to be processed for line-erasing and expedite the processes is desired.

Figure 12A:
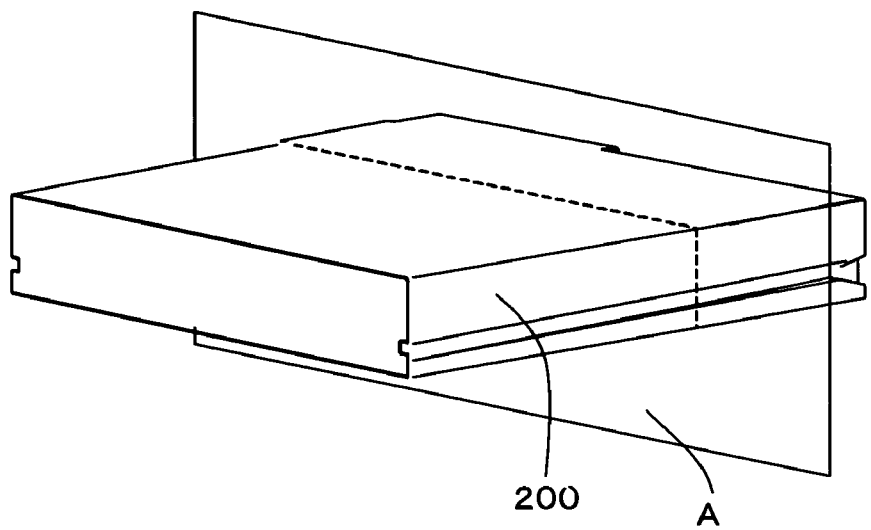
FIG. 12A illustrates a sectional-view display function for making one (1) side not be displayed (Part 1)
Figure 12B:
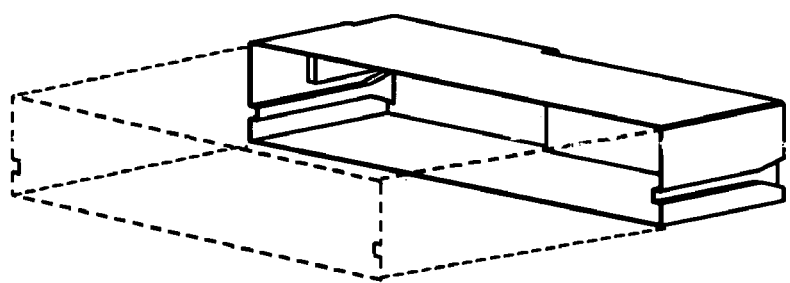
FIG. 12B illustrates the sectional-view display function for making the one (1) side not be displayed (Part 2)
Figure 12C:
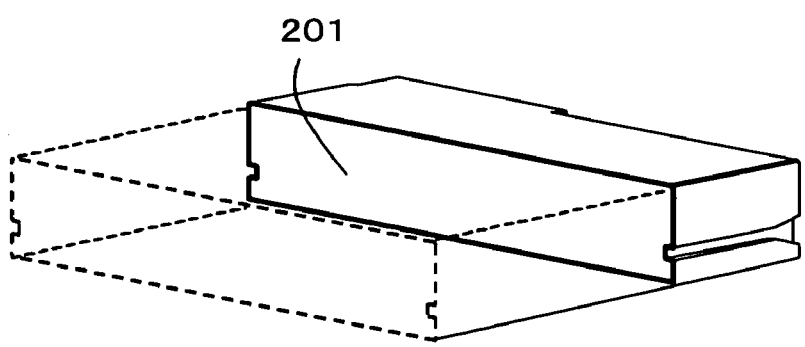
FIG. 12C illustrates the sectional-view display function for making the one (1) side not be displayed (Part 3)

As the second consideration, as shown in FIG. 12A, in a three-dimensional model display apparatus having a sectional-view-display function that makes a side of an arbitrary reference plane A be not displayed, in the case where a three-dimensional model 200 is projected as a line image (onto a two-dimensional plane) from an arbitrary direction, as shown in FIG. 12B, a polygon is created on a sectional portion where the reference plane A and the three-dimensional shape model 200 cross each other, thereafter, as shown in FIG. 12C, a hidden-line processing is executed and an line image in which the interior of the model is observed on a solid plane 201 is created.

In this case, it is possible to create a line image in which the interior of the model is observed on a solid plane 201. However, it is necessary for this method to recognize the shape of the sectional view where the reference plane A and the model 200 cross each other, thereafter, to create polygons in the shape of the sectional view and to execute the hidden-line processing. In this case, as described above, the hidden-line processing by polygons needs a large amount of calculation and much more calculation process is necessary. Therefore, in order to reduce the amount of the calculation as much as possible, a method for creating a line image, with reduced number of lines to obtain is desired.

Furthermore, as the third consideration, in the above three-dimensional model display apparatus having a sectional-view-display function that processes a side of an arbitrary reference plane, in the case where a three-dimensional model is projected as a line image from an arbitrary direction, a method is used, in which a line image for easily grabbing the shape of the sectional portion and the entire model is created by outputting the portion of the side to be processed from the reference plane A in a predetermined format such as a dotted line. In this case, processes as follows are executed.

Figure 13A:
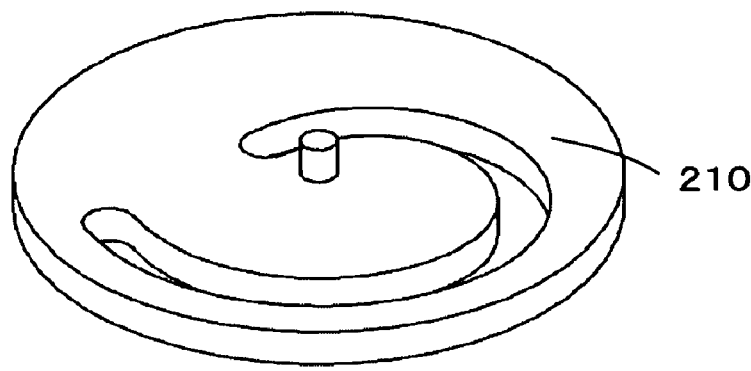
FIG. 13A illustrates a process for outputting a side to be processed from a reference plane in a predetermined format such as a dotted line when the three-dimensional model is projected into a line image from an arbitrary direction (Part 1)

First, as shown in FIG. 13A, a line image displaying the entire model 210 for the case where the sectional view is not displayed is created. The relation of the positions of the reference plane and the constituent lines is calculated. Each of the constituent lines across the side to be processed and the side not to be processed is divided at the reference plane into two (2) and the lines on the side to be processed are lines to be processed and other lines are visible lines.

Figure 13B:
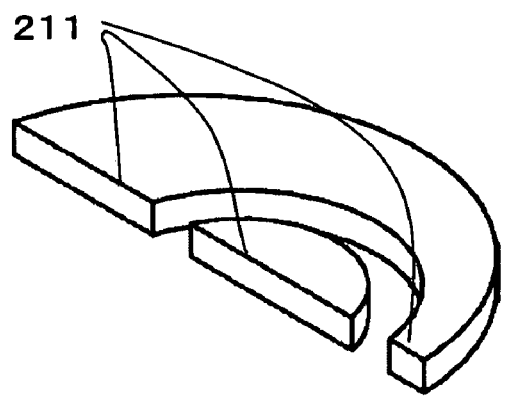
FIG. 13B illustrates the process for outputting the side to be processed from the reference plane in a predetermined format such as a dotted line when the three-dimensional model is projected into the line image from the arbitrary direction (Part 2)
Figure 13C:
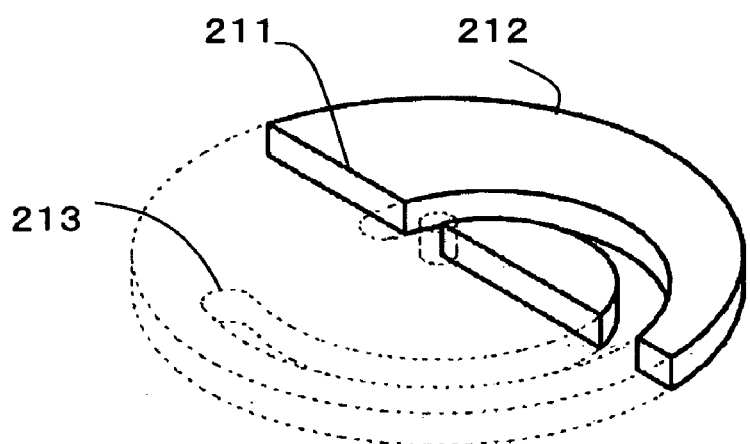
FIG. 13C illustrates the process for outputting the side to be processed from the reference plane in a predetermined format such as a dotted line when the three-dimensional model is projected into the line image from the arbitrary direction (Part 3)

Next, as shown in FIG. 13B, a sectional line 211 is created at the outline portion of the shape created by the crossing of the reference plane and the model 210 with each other. Then, as shown in FIG. 13C, a visible line 212, a processed line 213 and the sectional line 211 are outputted in a predetermined format.

In the above third consideration, as described above, the calculation cost of (the number of the ridge/outline liens)× (the number of polygons necessary for hidden-line processing) is necessary for creating a hidden-line-processed line image geometrically with polygons. In addition to this, all the constituent lines of the line image to display the entire model, determination of the position of the reference plane and creation of the sectional lines are necessary. As the model becomes larger-scale, the cost for creating the hidden-line-processed line image becomes high. Therefore, a method for creating a line image reducing the amount of the calculation for hidden-line processing as far as possible is desired.

Yet furthermore, as the fourth consideration, in order to express the parts interfering with each other in a two-dimensional line image into which a three-dimensional mode has been projected, the interfered portions are reflected by checking the interference using three-dimensional shapes and displaying marks and comments indicating the interfered points on the drawing (line image).

Figure 14A:
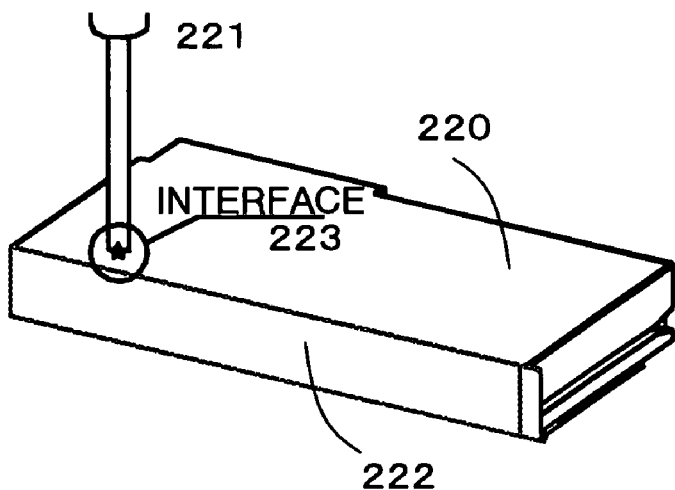
FIG. 14A illustrates a display when another model interferes with the three-dimensional model on it (Part 1)

FIG. 14A. shows an example for the case where interference caused when a driver 221 being another model hits onto the three-dimensional model 220 is displayed. An indication mark 223 is displayed at the position corresponding to the interfered portion (contact point) of the three-dimensional model 220 and the driver 221. In this case, it is necessary to check the interference using three-dimensional shapes. Therefore, check of interference is necessary in addition to the hidden-line processing and it is necessary to execute two (2) processes each needing a large amount of calculation.

Figure 14B:
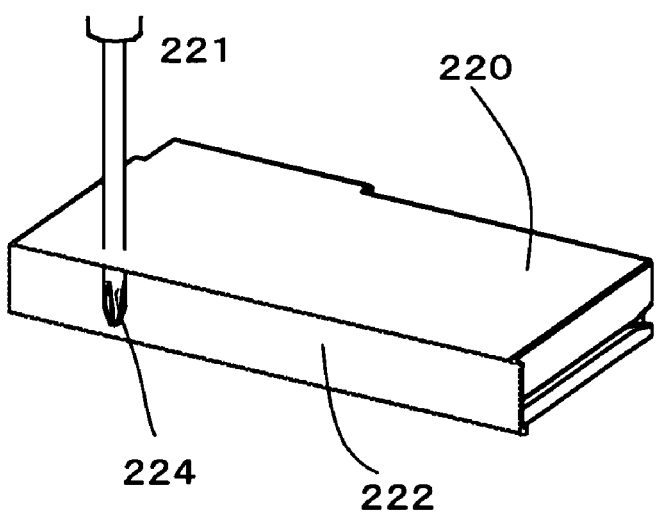
FIG. 14B illustrates the display when another model interferes with the three-dimensional model on it (Part 2)

In contrast, as shown in FIG. 14B corresponding to FIG. 14A, if it is possible to display in the sectional view shape a tip portion 224 of the driver 221, positioned in the deeper side of the sectional view shape of a three-dimensional model 222 and interfering with the three-dimensional model 220, it is not necessary to check the interference.

Therefore, in view of the above first to fourth considerations, further feature of the present invention observed from a different aspect is to facilitating the speedup considered commonly in the above first to fourth considerations by executing a process for reducing the number of lines to be hidden-line processed. An example of the process according to the present invention for reducing the number of lines to be hidden-line processed will be described as follows.

Figure 15:
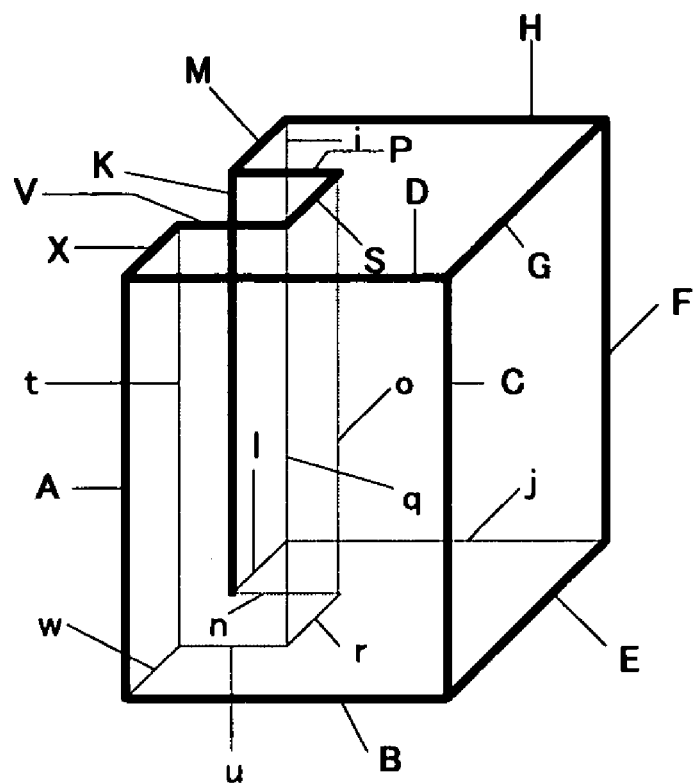
FIG. 15 illustrates ridge/contour lines and internal lines of the three-dimensional model.

FIG. 15 illustrates the ridge/contour lines and internal lines of a three-dimensional model. The part model of the structure shown in FIG. 15 comprises the lines of a first group (A, B, C, D, E, F, G, H, K, M, P, S, V and X) and the lines, of a second group (i, n, j, l, n, o, q, r, t, u and w).

Among these lines, the lines of the second group are internal lines. Those internal lines are surely not displayed on the two-dimensional screen. Therefore, according to the further feature of the present invention, only the lines represented by thick lines in FIG. 15 are obtained.

Here, the line to be a common side of polygons adjacent to each other in a three-dimensional model will be considered.

Figure 16:
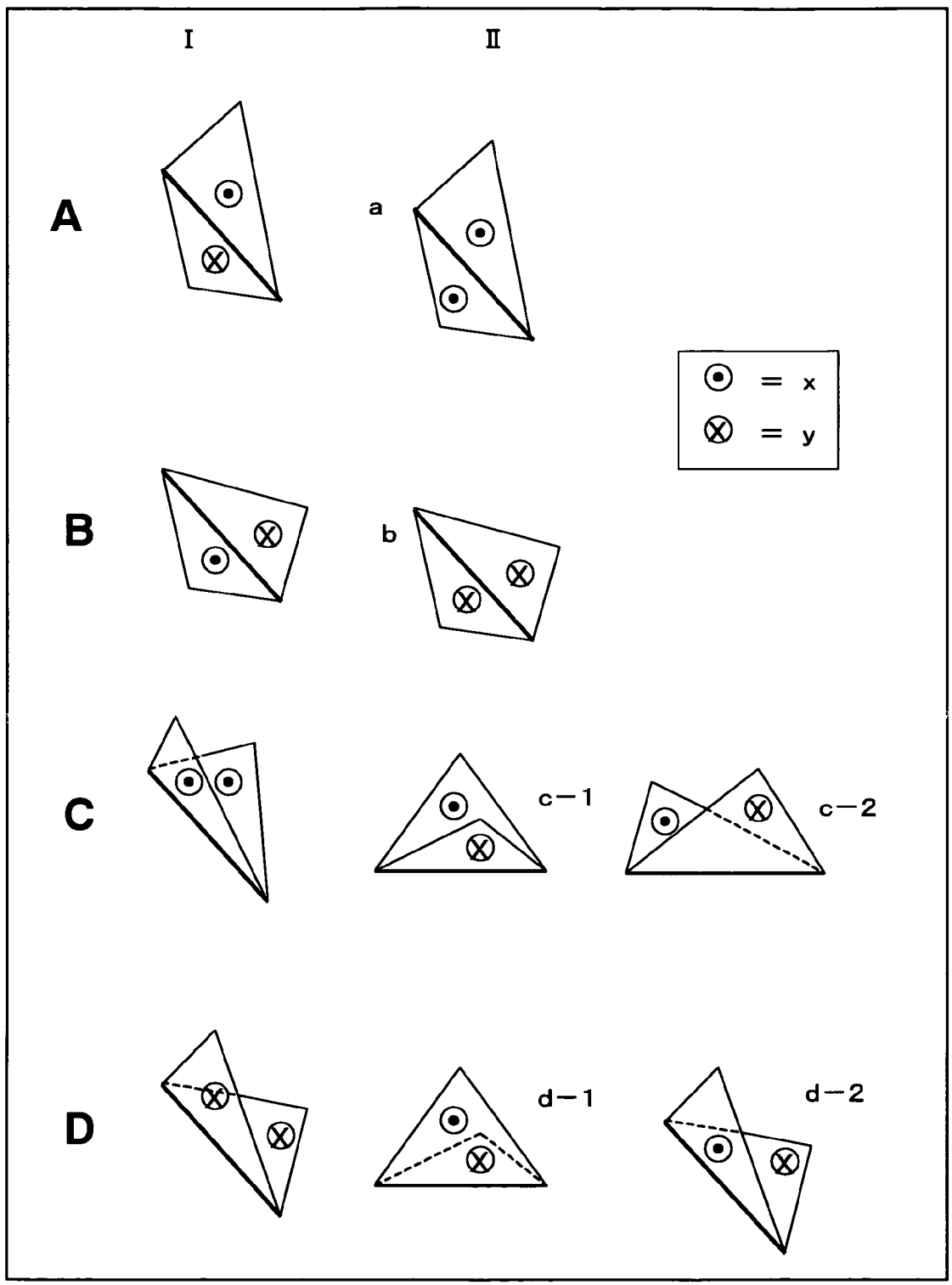
FIG. 16 illustrates the senses of normal vectors x, y that a polygon has.

FIG. 16 illustrates the directions of the normal vectors x, y that each polygon has. In FIG. 16, the direction x of a vector in a direction toward the line of sight of the corresponding polygon is indicated by a circle surrounding a black point at the center and the direction y of a vector in a direction against the line of sight of the corresponding polygon is indicated by a circle surrounding an x at the center.

For polygons adjacent to each other having a common side, aspects A, B, C and D of the direction of four (4) normal lines in a first group I shown in FIG. 16 can not considered in a three-dimensional model. Direction aspects a, b, c-1, c-2, d-1 and d-2 of normal lines in a second group II can be considered.

Figure 17:
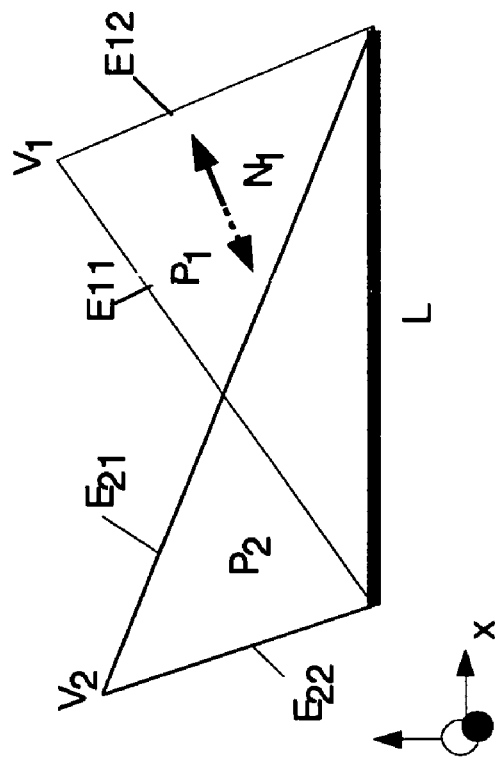
FIG. 17 shows generalizing polygons adjacent to each other having a common side.

Here, polygons adjacent to each other having a common side are shown in FIG. 17 being generalized. In FIG. 17, L is a ridge/contour line. Pi is a polygon having, the, ridge/contour line as one (1) of its sides. In FIG. 17, polygons P1 and P2. having a ridge/contour line as a common side are shown. In addition, Ni is a normal vector of the polygon Pi.

Vector N1 a normal vector of polygon P1. Vi is a vertex of the polygon Pi, being not an end of the ridge/contour line. V2 the vertex of polygon P2. Eij indicates a side of the polygon Pi, being not a ridge/contour line. Sides E11 and E12 are sides of polygon P1.

Figure 18:
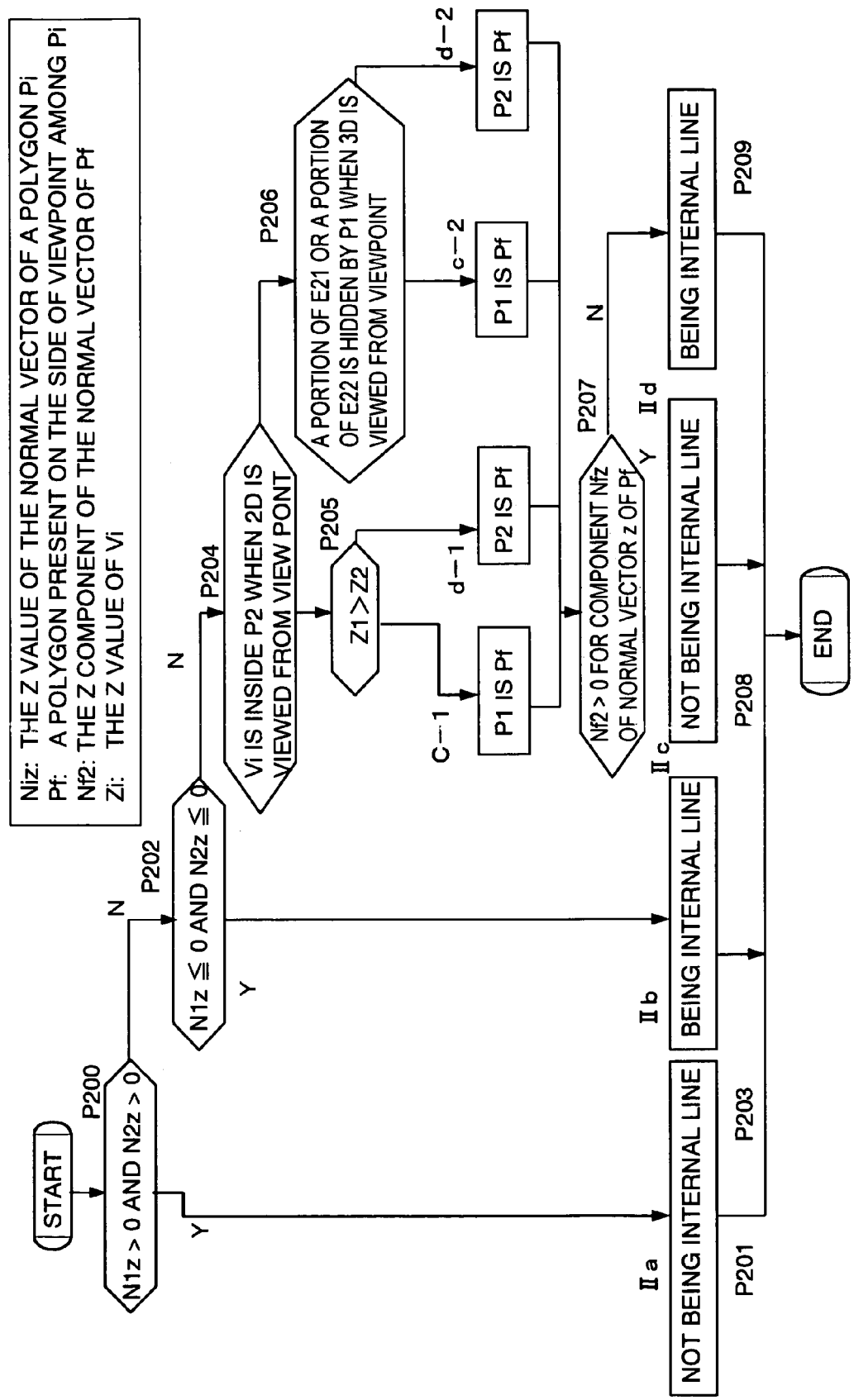
FIG. 18 shows a process flow as a feature of the present invention, for determining whether or not a line constituting a part model is an internal line.
Figure 19:
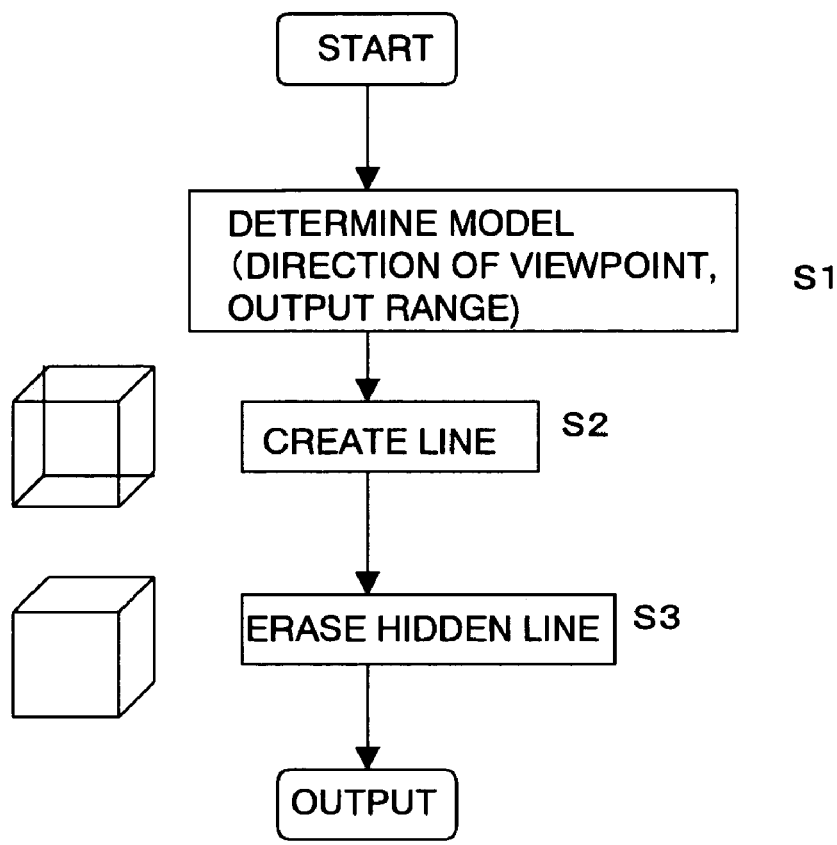
FIG. 19 shows positioning of the process shown in FIG. 18 as an embodiment.

Based on the above preconditions, FIG. 18 shows a process flow as a feature of the present invention, for determining whether or not a line constituting a part model is an internal line. The positioning of the process shown in FIG. 18 is as shown in FIG. 19 as an example. That is, the direction of the line of sight and the range to be outputted are determined by determining a model in Step S1. Next, creation of a line is executed (Step S2). In the course of the creation of the line, a process of the process flow shown in FIG. 18 is executed such that an internal line is not selected. Thereafter, in Step S3, a process for erasing hidden lines described according to the process shown in FIG. 3 is executed.

However, it is possible to execute the process flow, shown in FIG. 18, for reducing the number of lines obtained from the three-dimensional model, not only in the case where it is executed as a pre-treatment for the flow of the hidden-line processing shown in FIGS. 2 and 3 with regard to the above first consideration, but also in the case where it is executed independent of the flow of the hidden-line processing shown in FIGS. 2 and 3. For example, it is also possible to execute the above process flow in relation to the above second to fourth consideration.

Figure 20:
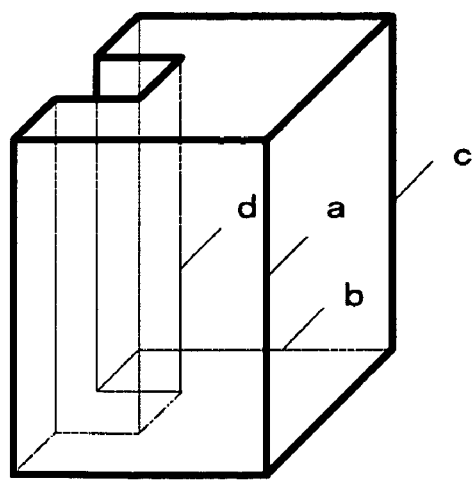
FIG. 20 is, a perspective view shown corresponding to the model shown in FIG. 15.

Describing referring back to FIG. 18, whether positive or negative is determined for each of normal vector values $N1z$ and $N2z$ of each of the polygons P1 and P2 having the side L as a common ridge/contour line (Process Step P200). If both of the normal vector values $N1z$ and $N2z$ are positive (Process Step P200, Y), the side L is, for example, same as the side a in, for example, a perspective view shown as FIG. 20 shown corresponding to the model in FIG. 15 and, in addition, is same as an aspect of IIa in FIG. 16 and is not an internal line (Process Step P201).

In Process Step P200, if a condition that the normal vector values $N1z$ and $N2z$ are both positive is not satisfied (Process Step P200, N), whether both of them are zero (0) or negative is determined (Process Step P202). If both of the normal vector values $N1z$ and $N2z$ are zero (0) or negative (Process Step P202, Y), the side L is same as, for example, the side b of the model shown in FIG. 20, an aspect of IIb in FIG. 16 and is an internal line (Process Step P203).

If a condition that both of the normal vector values $N1z$ and $N2z$ are zero (0) or negative is not satisfied (Process Step P202, N), whether a vertex V1 of the polygon P1 is in the polygon P2 when the two-dimensional plane is observed from the viewpoint is determined (Process Step P204). If the vertex, V1 is in the polygon P2 (Process Step P204, Y), the side L corresponds to either IIc-1 or IId-1 in FIG. 16. On the other hand, if the vertex V1 of the polygon P1 is not in the polygon P2 (Process Step P204, N), the side L corresponds to either IIc-2 or IId-2 in FIG. 16.

When the side L corresponds to either IIc-1 or IId-1 in FIG. 16., in the case where the relation between the normal vector values Z1 and Z2 respectively of the polygon P1 and the polygon P2 is Z1>Z2 (Process Step P205, Y), assuming that the polygon P1 is Pf (c-1) and, if the normal vector values are Z2>Z1 (Process Step P205, N), the polygon P2 is Pf (d-1).

Furthermore, in the case where the side L corresponds to either IIc-2 or IId-2 in FIG. 16 and is observed from the viewpoint three-dimensionally, when a portion of a side E21 or a portion of a side E22 of the polygon P2 is hidden by the polygon P1 (Process Step P6, Y), the Polygon P1 is Pf (c-2). When neither of a portion of the side E21 or a portion of a side E22 of the polygon P2 is not hidden by the polygon P1 (Process Step P206, N), the polygon P2 is Pf (d-2).

Next, in the case where the z-component Nf2 of the normal vector of Pf is positive (Process Step P207, Y), the side L is not an internal line corresponding to the embodiments in FIG. 16, IIc-1 and IIc-2 (Process Step P208).

On the contrary, in the case where the z-component Nf2 of the normal vector of Pf is zero (0) or negative (Process Step P207, N), the side L is determined to be an internal line and corresponds to, for example, a ridge line d in FIG. 20 and is actually an internal line (Process Step P209).

By identifying an internal line in advance and not obtaining it as described above, it is possible to exclude it from the targets to be line erased and to expedite [Line-Erasing Processes by Polygon Groups] (Process, Steps P3, P4 and P6). Thereby, solution of the problem discussed in the first consideration is facilitated.

That is, it is possible to realize the speedup by approximately 50% by the above process of FIG. 18. As an example, assuming the number of ridge lines/contour lines obtained from the three-dimensional model to be 100 and each of the number of lines corresponding to the aspects of IIa, IIb, IIc and IId in FIG. 16 respectively is 25, it is possible to determine each of the 25 lines in the aspects of IIb and IId as hidden-lines instantly.

Furthermore, since it is possible to determine internal lines appearing when the interior of the model is displayed by utilizing the method for detecting internal lines according to FIG. 18, it is possible to create a line image in which the interior can be seen in a solid plane, quickly and easily without creating polygons on the sectional view shape as shown in FIG. 12C. Therefore, the problems in the second consideration can be solved.

Furthermore, as described referring to FIGS. 13A–13C in relation to the third consideration, the formats of lines are distinguished for the side to be processed and the side not to be processed at a reference plane as the border and sectional view lines are outputted in a predetermined format. The process procedure as follows is executed in order to obtain quickly a line image with which the shape of the entire model and concurrently the sectional view shape can be easily grabbed by the above process.

First, the polygons constituting a three-dimensional model are distinguished as those present on the side to be processed and as those present on the side not to be processed from the reference plane. Then, the polygons crossing the sectional view lines are distinguished as the portions present on the side to be processed and the portions present on the side not to be processed.

Ridge lines/contour lines are created from the polygons on the side to be processed and hidden-line processing is executed by the polygons on the side to be processed. Thereby, a line image on the side to be processed from the reference plane is created by hidden-line processing according to the process flow shown in FIGS. 2 and 3. Similarly, ridge lines/contour lines are created from the polygons on the side not to be processed and hidden-line processing is executed by the polygons on the side not to be according to the process flow shown in FIGS. 2 and 3. The line images on the side to be processed and on the side not to be processed created in this manner are synthesized and necessary sectional lines are added to the synthesized image.

Thereby, it is possible to obtain quickly a line image with which the shape of the entire model as shown in FIG. 13C and concurrently the sectional view shape can be easily grabbed.

That is, the case where $1.2 \times 10^5$ ridge lines/contour lines are created from a three-dimensional model having $1.0 \times 10^5$ polygons is considered. In the conventional art the amount of calculation is approximately as follows.

(The Amount of Calculation)$\approx (1.0 \times 10^5) \times (1.2 \times 10^5) = 1.2 \times 10^{10}$ According to the method of the present invention, in the case where there are $5.0 \times 10^4$ polygons respective on the side to be processed and on the side not to be processed and where $6.0 \times 10^4$ ridge lines/contour lines are created respectively on both sides and a half of the ridge lines/contour lines is internal lines, assuming that the amount of calculation necessary for the process for dividing the polygons at a reference plane and for determining internal lines is negligible, the amount of calculation is reduced by approximately 75% as follows.

(Amount of Calculation)$\approx (5.0 \times 10^4) \times (3.0 \times 10^4) \times 2 = 3.0 \times 10^9$ Furthermore, in relation to the fourth consideration, utilizing the method for detecting internal lines according to FIG. 18, as described referring to FIG. 14B, the interfering portion of a part 301, present in the deeper side of the sectional view shape of the part 220 and interfering with the part 221 is not determined as an internal line. Therefore, it is possible to display an interfered portion 223 inside the sectional view shape without checking the interference. That is, it is possible to display only the lines of component 223 of the part 221 interfering with the part 220 inside the sectional view shape of the part 220 of which the sectional view is to be displayed and it is possible to create quickly inside the sectional view shape a two-dimensional line image displaying the interfered portion.

As set forth hereinabove referring to the drawings, according to the present invention, it is possible to reduce the amount of data to be processed in handling shape recognition etc. as a model having virtual three-dimensional space coordinate data by a three-dimensional CAD and a mechanism simulator. Thereby, it is possible to facilitate speedup of the processing speed in the three-dimensional CAD and a mechanism simulator. Therefore, the industrial contribution of the present invention is great.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A hidden line processing method for avoiding projection of lines hidden by a plurality of polygons in projecting a three-dimensional model consisting of the polygons onto a two-dimensional plane, the method comprising:

obtaining the maximum value $PZ_{max}$ of the Z-axis direction component of each vertex in a viewpoint coordinate system for each of the plurality of polygons belonging to parts constituting the three-dimensional model;

sorting the plurality of polygons in a descending order based on the obtained maximum values $PZ_{max}$;

obtaining a value $LZ_{min}$ that is the smaller of the Z-axis direction components in the viewpoint coordinate system of two (2) end points of an arbitrary line obtained from the plurality of polygons;

comparing the maximum value $PZ_{max}$ of the Z-axis direction component of the plurality of polygons with the value $LZ_{min}$ that is the smaller of the above obtained Z-axis direction components of the arbitrary line, in the sorted order, wherein at the time when $LZ_{min} \geq PZ_{max}$, determination of whether or not the lines are hidden lines is avoided for polygons subsequent to the plurality of polygons sorted displaying the resulting three-dimensional model consisting of the polygons on a two-dimensional plane.

2. The hidden line processing method according to claim 1, wherein, for the plurality of polygons belonging to the arbitrary part, each of their normal vectors has a component in the opposite direction against the direction of the line of sight from the viewpoint of the viewpoint coordinate system.

3. The hidden line processing method according to claim 1, wherein the arbitrary line is a side common to polygons adjacent to each other, of which the angle formed by respective normal vectors is not equal or close to 0°.

4. The hidden line processing method according to claim 1, further comprising:

defining an inclusive circle including vertices of the polygon when each of the plurality of polygons is projected onto a two-dimensional plane;

determining whether a portion of an arbitrary line is present in the inclusive circle corresponding to the polygon for the polygons for which determination of whether or not the line is an internal line is not avoided; and erasing hidden line portions on the two-dimensional plane when the portion of the arbitrary line is present in the inclusive circle.

5. The hidden line processing method according to claim 1, further comprising:

determining the value in the Z-axis direction of the normal vector belonging to each of the two polygons having a ridge line or an contour line of the three-dimensional model as a common side;

determining the common side as an internal line when the value in the Z-axis direction of any of the normal vectors of the two polygons is zero (0) or less based on the determination of the directions of the normal vectors; and excluding the line determined as an internal line from the target of the arbitrary lines.

6. The hidden line processing method according to claim 5, wherein the normal vectors of the plurality of polygons belonging to the arbitrary part have components in the opposite direction against the direction of the line of sight from the viewpoint in the viewpoint coordinate system.

7. The method for determining an internal line according to claim 5, further comprising:

determining the common side as an internal line when the senses of the values in the Z-axis direction of the normal vectors respectively belonging to each of the two polygons are different from each other based on the determination of the directions of the normal vectors, when a vertex of a polygon of the two polygons is in the other polygon, when the value in the Z-axis direction of a vertex of a polygon is larger than the value in the Z-axis direction of a vertex of the other polygon and when the direction of the normal vector of the polygon is negative.

8. The method for determining an internal line according to claim 5, further comprising:

determining the common side as an internal line when the senses of the values in the Z-axis direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

9. A hidden line processing method for avoiding projection of lines hidden by a plurality of polygons in projecting a three-dimensional model consisting of the polygons onto a two-dimensional plane, the method comprising:

for a priority polygon group including a predetermined number of polygons obtained in the order of large projection area made when each of a plurality of polygons constituting a three-dimensional model is projected onto a two-dimensional plane, and for a plurality of polygon groups constituting a part to which a line undergoing determination to be a hidden line or not, in the order of the priority polygon group and the plurality of polygon groups constituting the part, obtaining the maximum value $PZ_{max}$ of the Z-axis direction component of each vertex in a viewpoint coordinate system for each of the plurality of polygons;

sorting the plurality of polygons in a descending order based on the obtained maximum values $PZ_{max}$;

obtaining a value $LZ_{min}$ that is the smaller of the Z-axis direction components in the viewpoint coordinate system, of two (2) end points of an arbitrary line obtained from the plurality of polygons; and comparing the maximum value $PZ_{max}$ of the Z-axis direction component of the plurality of polygons with the value $LZ_{min}$ that is the smaller of the above obtained Z-axis direction components of the arbitrary line, in the sorted order, wherein at the time when $LZ_{min} \geq PZ_{max}$, determination of whether or not the lines are hidden lines is avoided for polygons subsequent to the plurality of polygons sorted displaying the resulting three-dimensional model consisting of the polygons on a two-dimensional plane.

10. The hidden line processing method according to claim 9, wherein the arbitrary line is a side common to polygons adjacent to each other, of which the angle formed by respective normal vectors is not equal or close to 0°.

11. The hidden line processing method according to claim 9, further comprising:

defining an inclusive circle including vertices of the polygon when each of the plurality of polygons is projected onto a two-dimensional plane;

determining whether a portion of an arbitrary line is present in the inclusive circle corresponding to the polygon for the polygons for which determination of whether or not the line is an internal line is not avoided; and erasing hidden line portions on the two-dimensional plane when the portion of the arbitrary line is present in the inclusive circle.

12. The hidden line processing method according to claim 9, further comprising:

determining the value in the Z-axis direction of the normal vector belonging to each of the two polygons having a ridge line or an contour line of the three-dimensional model as a common side;

determining the common side as an internal line when the value in the Z-axis direction of any of the normal vectors of the two polygons is zero (0) or less based on the determination of the directions of the normal vectors; and excluding the line determined as an internal line from the target of the arbitrary lines.

13. The hidden line processing method according to claim 12, wherein the normal vectors of the plurality of polygons belonging to the arbitrary part have components in the opposite direction against the direction of the line of sight from the viewpoint in the viewpoint coordinate system.

14. The method for determining an internal line according to claim 12, further comprising:

determining the common side as an internal line when the senses of the values in the Z-axis direction of the normal vectors respectively belonging to each of the two polygons are different from each other based on the determination of the directions of the normal vectors, when a vertex of a polygon of the two polygons is in the other polygon, when the value in the Z-axis direction of a vertex of a polygon is larger than the value in the Z-axis direction of a vertex of the other polygon and when the direction of the normal vector of the polygon is negative.

15. The method for determining an internal line according to claim 12, further comprising:

determining the common side as an internal line when the senses of the values in the Z-axis direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

16. An information processing apparatus for creating a two-dimensional image by projecting a three-dimensional model consisting of a plurality of polygons onto a two-dimensional plane, comprising:

a memory storing a program for processing of avoiding projecting of lines hidden by the polygons, and program data;

program executing and controlling unit executing reading out of the program stored in the memory: and a display apparatus for outputting and displaying a two-dimensional image created by the program executed and controlled by the program executing and controlling means, wherein the program executing and controlling means, according to the program and based on the program data stored in the memory, obtains the maximum value $PZ_{max}$ of the Z-axis direction component of each vertex in a viewpoint coordinate system for each of the plurality of polygons belonging to parts constituting the three-dimensional model;

sorts the plurality of polygons in a descending order based on the obtained maximum values $PZ_{max}$;

obtains a value $LZ_{min}$ that is the smaller of the Z-axis direction components in the viewpoint coordinate system of two (2) end points of an arbitrary line obtained from the plurality of polygons;

compares the maximum value $PZ_{max}$ of the Z-axis direction component of the plurality of polygons with the value $LZ_{min}$ that is the smaller of the above obtained Z-axis direction components of the arbitrary line, in the sorted order; and at the time when $LZ_{min} \geq PZ_{max}$, executes a process for avoiding determination of whether or not the lines are hidden lines for polygons subsequent to the plurality of polygons sorted.

17. The information processing apparatus according to claim 16, wherein, for the plurality of polygons belonging to the arbitrary part, each of their normal vectors has a component in the opposite direction against the direction of the line of sight from the viewpoint of the viewpoint coordinate system.

18. The information processing apparatus according to claim 16, wherein the arbitrary line is a side common to polygons adjacent to each other, of which the angle formed by respective normal vectors is not equal or close to 0°.

19. The information processing apparatus according to claim 16, wherein the program executing and controlling means, according to the program, further;

defines an inclusive circle including vertices of the polygon when each of the plurality of polygons is projected onto a two-dimensional plane;

determines whether a portion of an arbitrary line is present in the inclusive circle corresponding to the polygon for the polygons for which determination of whether or not the line is an internal line is not avoided; and erases hidden line portions of a line on the two-dimensional plane when the portion of the arbitrary line is present in the inclusive circle.

20. The information processing apparatus according to claim 16, wherein the program executing and controlling means further:

determines the value in the Z-axis direction of the normal vector belonging to each of the two polygons having a ridge line or an contour line of the three-dimensional model as a common side;

determines the common side as an internal line when the value in the Z-axis direction of any of the normal vectors of the two polygons is zero (0) or less based on the determination of the directions of the normal vectors; and excludes the line determined as an internal line from the target of the arbitrary lines.

21. The information processing apparatus according to claim 20, wherein the normal vectors of the plurality of polygons belonging to the arbitrary part have components in the opposite direction against the direction of the line of sight from the viewpoint in the viewpoint coordinate system.

22. The information processing apparatus according to claim 20, wherein the program executing and controlling means, according to the program, further:

determines the common side as an internal line when the senses of the values in the Z-axis direction of the normal vectors respectively belonging to each of the two polygons are different from each other based on the determination of the directions of the normal vectors, when a vertex of a polygon of the two polygons is in the other polygon, when the value in the Z-axis direction of a vertex of a polygon is larger than the value in the Z-axis direction of a vertex of the other polygon and when the direction of the normal vector of the polygon is negative.

23. The information processing apparatus according to claim 20, wherein the program executing and controlling means further:

determines the common side as an internal line when the senses of the values in the Z-axis direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

24. An information processing apparatus for creating a two-dimensional image by projecting a three-dimensional model consisting of a plurality of polygons onto a two-dimensional plane, comprising:

a memory storing a program for processing of avoiding projecting of lines hidden by the polygons, and program data;

program executing and controlling unit executing reading out of the program stored in the memory: and a display apparatus for outputting and displaying a two-dimensional image created by the program executed and controlled by the program executing and controlling means, wherein the program executing and controlling means, according to the program and based on the program data stored in the memory, for a priority polygon group including a predetermined number of polygons obtained in the order of large projection area made when each of a plurality of polygons constituting a three-dimensional model is projected onto a two-dimensional plane, and for a plurality of polygon groups constituting a part to which a line undergoing determination to be a hidden line or not; and in the order of the priority polygon group and the plurality of polygon groups constituting the part, obtains the maximum value $PZ_{max}$ of the Z-axis direction component of each vertex in a viewpoint coordinate system for each of the polygons;

sorts the plurality of polygons in a descending order based on the obtained maximum values $PZ_{max}$;

obtains a value $LZ_{min}$ that is the smaller of the Z-axis direction components in the viewpoint coordinate system, of two (2) end points of an arbitrary line obtained from the plurality of polygons;

comparing the maximum value $PZ_{max}$ of the Z-axis direction component of the plurality of polygons with the value $LZ_{min}$ that is the smaller of the above obtained Z-axis direction components of the arbitrary line, in the sorted order, and at the time when $LZ_{min} \geq PZ_{max}$, executes a process for avoiding determination of whether or not the lines are hidden lines for polygons subsequent to the plurality of polygons sorted.

25. The information processing apparatus according to claim 24, wherein the arbitrary line is a side common to polygons adjacent to each other, of which the angle formed by respective normal vectors is not equal or close to 0°.

26. The information processing apparatus according to claim 24, wherein the program executing and controlling means, according to the program, further;

defines an inclusive circle including vertices of the polygon when each of the plurality of polygons is projected onto a two-dimensional plane;

determines whether a portion of an arbitrary line is present in the inclusive circle corresponding to the polygon for the polygons for which determination of whether or not the line is an internal line is not avoided; and erases hidden line portions of a line on the two-dimensional plane when the portion of the arbitrary line is present in the inclusive circle.

27. The information processing apparatus according to claim 24, wherein the program executing and controlling means further:

determines the value in the Z-axis direction of the normal vector belonging to each of the two polygons having a ridge line or an contour line of the three-dimensional model as a common side;

determines the common side as an internal line when the value in the Z-axis direction of any of the normal vectors of the two polygons is zero (0) or less based on the determination of the directions of the normal vectors; and excludes the line determined as an internal line from the target of the arbitrary lines.

28. A program stored on a computer readable storage medium the program executed and controlled in an information processing apparatus for creating a two-dimensional image by projecting a three-dimensional model consisting of a plurality of polygons onto a two-dimensional plane, the program being operable to execute a process for avoiding projecting of lines hidden by the polygons, the program comprising the instruction causing program executing and controlling means to, based on program data stored in a memory:

obtain the maximum value $PZ_{max}$ of the Z-axis direction component of each vertex in a viewpoint coordinate system for each of the plurality of polygons belonging to parts constituting the three-dimensional model;

sort the plurality of polygons in a descending order based on the obtained maximum values $PZ_{max}$;

obtain a value $LZ_{min}$ that is the smaller of the Z-axis direction components in the viewpoint coordinate system of two (2) end points of an arbitrary line obtained from the plurality of polygons;

compare the maximum value $PZ_{max}$ of the Z-axis direction component of the plurality of polygons with the value $LZ_{min}$ that is the smaller of the above obtained Z-axis direction components of the arbitrary line, in the sorted order; and at the time when $LZ_{min} \geq PZ_{max}$, execute a process for avoiding determination of whether or not the lines are hidden lines for polygons subsequent to the plurality of polygons sorted.

29. The program stored on the computer readable storage medium according to claim 28, wherein, for the plurality of polygons belonging to the arbitrary part, each of their normal vectors has a component in the opposite direction against the direction of the line of sight from the viewpoint of the viewpoint coordinate system.

30. The program stored on the computer readable storage medium according to claim 28, wherein the arbitrary line is a side common to polygons adjacent to each other, of which the angle formed by respective normal vectors is not equal or close to 0°.

31. The program stored on the computer readable storage medium according to claim 28, wherein the program further causes the program executing and controlling apparatus to:

define an inclusive circle including vertices of the polygon when each of the plurality of polygons is projected onto a two-dimensional plane;

determine whether a portion of an arbitrary line is present in the inclusive circle corresponding to the polygon for the polygons for which determination of whether or not the line is an internal line is not avoided; and erase hidden line portions of a line on the two-dimensional plane when the portion of the arbitrary line is present in the inclusive circle.

32. The program stored on the computer readable storage medium according to claim 28, wherein the program further causes the program executing and controlling means to:

determine the value in the Z-axis direction of the normal vector belonging to each of the two polygons having a ridge line or an contour line of the three-dimensional model as a common side;

determine the common side as an internal line when the value in the Z-axis direction of any of the normal vectors of the two polygons is zero (0) or less based on the determination of the directions of the normal vectors; and exclude the line determined as an internal line from the target of the arbitrary lines.

33. The program stored on the computer readable storage medium according to claim 32, wherein the normal vectors of the plurality of polygons belonging to the arbitrary part have components in the opposite direction against the direction of the line of sight from the viewpoint in the viewpoint coordinate system.

34. The program stored on the computer readable storage medium according to claim 32, wherein the program further causes the program executing and controlling means to:

determine the common side as an internal line when the senses of the values in the Z-axis direction of the normal vectors respectively belonging to each of the two polygons are different from each other based on the determination of the directions of the normal vectors, when a vertex of a polygon of the two polygons is in the other polygon, when the value in the Z-axis direction of a vertex of a polygon is larger than the value in the Z-axis direction of a vertex of the other polygon and when the direction of the normal vector of the polygon is negative.

35. The program stored on the computer readable storage medium according to claim 32, wherein the program further causes the program executing and controlling means to:

determine the common side as an internal line when the senses of the values in the Z-axis direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

36. A program stored on a computer readable storage medium the program executed and controlled in an information processing apparatus for creating a two-dimensional image by projecting a three-dimensional model consisting of a plurality of polygons onto a two-dimensional plane, the program being operable to execute a process for avoiding projecting of lines hidden by the polygons, the program comprising the steps of causing program executing and controlling means to, based on program data read out from a memory:

for a priority polygon group including a predetermined number of polygons obtained in the order of large projection area made when each of a plurality of polygons constituting a three-dimensional model is projected onto a two-dimensional plane, and for a plurality of polygon groups constituting a part to which a line undergoing determination to be a hidden line or not; and in the order of the priority polygon group and the plurality of polygon groups constituting the part, obtain the maximum value $PZ_{max}$ of the Z-axis direction component of each vertex in a viewpoint coordinate system for each of the polygons;

sort the plurality of polygons in a descending order based on the obtained maximum values $PZ_{max}$;

obtain a value $LZ_{min}$ that is the smaller of the Z-axis direction components in the viewpoint coordinate system, of two (2) end points of an arbitrary line obtained from the plurality of polygons;

compare the maximum value $PZ_{max}$ of the Z-axis direction component of the plurality of polygons with the value $LZ_{min}$ that is the smaller of the above obtained Z-axis direction components of the arbitrary line, in the sorted order, and at the time when $LZ_{min} \geq PZ_{max}$, execute a process for avoiding determination of whether or not the lines are hidden lines for polygons subsequent to the plurality of polygons sorted.

37. The program stored on the computer readable storage medium according to claim 36, wherein
the arbitrary line is a side common to polygons adjacent to each other, of which the angle formed by respective normal vectors is not equal or close to 0°.

38. The program stored on the computer readable storage medium according to claim 36, wherein the program further causes the program executing and controlling apparatus to:
define an inclusive circle including vertices of the polygon when each of the plurality of polygons is projected onto a two-dimensional plane;
determine whether a portion of an arbitrary line is present in the inclusive circle corresponding to the polygon for the polygons for which determination of whether or not the line is an internal line is not avoided; and
erase hidden line portions of a line on the two-dimensional plane when the portion of the arbitrary line is present in the inclusive circle.

39. The program stored on the computer readable storage medium according to claim 36, wherein the program further causes the program executing and controlling means to:

determine the value in the Z-axis direction of the normal vector belonging to each of the two polygons having a ridge line or an contour line of the three-dimensional model as a common side;

determine the common side as an internal line when the value in the Z-axis direction of any of the normal vectors of the two polygons is zero (0) or less based on the determination of the directions of the normal vectors; and exclude the line determined as an internal line from the target of the arbitrary lines.

40. The program stored on the computer readable storage medium according to claim 39, wherein
the normal vectors of the plurality of polygons belonging to the arbitrary part have components in the opposite direction against the direction of the line of sight from the viewpoint in the viewpoint coordinate system.

41. The program stored on the computer readable storage medium according to claim 39, wherein the program further causes the program executing and controlling means to:
determine the common side as an internal line when the senses of the values in the Z-axis direction of the normal vectors respectively belonging to each of the two polygons are different from each other based on the determination of the directions of the normal vectors, when a vertex of a polygon of the two polygons is in the other polygon, when the value in the Z-axis direction of a vertex of a polygon is larger than the value in the Z-axis direction of a vertex of the other polygon and when the direction of the normal vector of the polygon is negative.

42. The program stored on the computer readable storage medium according to claim 39, wherein the program further causes the program executing and controlling means to:
determine the common side as an internal line when the senses of the values in the Z-axis direction of the normal vectors respectively belonging to each of the two polygons are different from each other based on the determination of the directions of the normal vectors, when a portion of a side of one of the two polygons is hidden by the other polygon and when the direction of the normal vector of the other polygon is negative.

* * * * *

UNITED STATES PATENT AND TRADEMARK OFFICE
CERTIFICATE OF CORRECTION

| | | |
|---|---|---|
| PATENT NO. | : 7,218,321 B2 | Page 1 of 1 |
| APPLICATION NO. | : 10/808534 | |
| DATED | : May 15, 2007 | |
| INVENTOR(S) | : Masayuki Kidera | |

It is certified that error appears in the above-identified patent and that said Letters Patent is hereby corrected as shown below:

Column 17, Line 35, after "polygons;" delete "and".

Column 21, Line 30, change "instruction" to --instructions--.

Column 22, Line 25, change "com puter" to --computer--.

Signed and Sealed this

Eleventh Day of September, 2007

JON W. DUDAS
*Director of the United States Patent and Trademark Office*